US 11,802,548 B2

(12) United States Patent
Calkins et al.

(10) Patent No.: US 11,802,548 B2
(45) Date of Patent: Oct. 31, 2023

(54) VARIABLE-POROSITY PANEL SYSTEMS AND ASSOCIATED METHODS

(71) Applicant: The Boeing Company, Chicago, IL (US)

(72) Inventors: Frederick T. Calkins, Renton, WA (US); Douglas E. Nicholson, Saint Charles, MO (US); Jordan Kreitzman, Saint Charles, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/679,696

(22) Filed: Feb. 24, 2022

(65) Prior Publication Data

US 2022/0349391 A1 Nov. 3, 2022

Related U.S. Application Data

(60) Provisional application No. 63/181,732, filed on Apr. 29, 2021.

(51) Int. Cl.
*F03G 7/06* (2006.01)
*B64C 23/00* (2006.01)
(Continued)

(52) U.S. Cl.
CPC .......... *F03G 7/06143* (2021.08); *B64C 21/02* (2013.01); *B64C 21/08* (2013.01);
(Continued)

(58) Field of Classification Search
CPC ......... F03G 7/0614–0615; F03G 7/065; B64C 21/02–08; B64C 23/00; B64C 23/005; B64D 2033/0206
See application file for complete search history.

(56) References Cited

U.S. PATENT DOCUMENTS 7,059,664 B2 * 6/2006 Aase ................. F15D 1/10
296/180.5
8,251,317 B2 8/2012 Pitt
(Continued)

OTHER PUBLICATIONS

Kreitzman, et al., "Active Acoustic Liners enabled by Shape Memory Alloy Technology," *AIAA Aviation 2020 Forum* (Jun. 15-19, 2020), pp. 1-10, doi.org/10.2514/6.2020-2617.

*Primary Examiner* — Laert Dounis
(74) *Attorney, Agent, or Firm* — Kolitch Romano Dascenzo Gates LLC

(57) ABSTRACT

Variable-porosity panel systems and associated methods. A variable-porosity panel system includes a panel assembly with an exterior layer defining a plurality of exterior layer pores and a sliding layer adjacent to the exterior layer and defining a plurality of sliding layer pores. The variable-porosity panel system additionally includes a shape memory alloy (SMA) actuator configured to translate the sliding layer relative to the exterior layer to modulate a porosity of the panel assembly. The SMA actuator includes an SMA element configured to exert an actuation force on the sliding layer and at least partially received within an SMA element receiver of the sliding layer. The SMA element extends out of the sliding layer only at a sliding layer first end. A method of operating the variable-porosity panel system includes assembling the variable-porosity panel system and/or transitioning the panel assembly of the variable-porosity panel system among the plurality of panel configurations.

20 Claims, 13 Drawing Sheets

(51) Int. Cl.
*B64C 21/08* (2023.01)
*B64C 21/02* (2006.01)
*B64D 33/02* (2006.01)

(52) U.S. Cl.
CPC .......... *B64C 23/005* (2013.01); *F03G 7/0614* (2021.08); *B64C 2230/06* (2013.01); *B64C 2230/20* (2013.01); *B64D 2033/0206* (2013.01)

(56) References Cited

U.S. PATENT DOCUMENTS

| | | | |
|---|---|---|---|
| 2011/0203861 A1* | 8/2011 | Charnesky | B60K 11/085 180/68.1 |
| 2011/0296826 A1* | 12/2011 | Pinto, IV | F03G 7/065 60/527 |
| 2015/0246737 A1* | 9/2015 | Haeberlein | F16M 13/022 248/288.11 |
| 2020/0047875 A1 | 2/2020 | Calkins et al. | |

\* cited by examiner

VARIABLE-POROSITY PANEL SYSTEMS AND ASSOCIATED METHODS

RELATED APPLICATION

This application claims priority to U.S. Provisional Patent Application No. 63/181,732, which was filed on Apr. 29, 2021, the complete disclosure of which is hereby incorporated by reference.

STATEMENT OF POTENTIAL GOVERNMENT RIGHTS

The invention described herein was made in the performance of work under NASA Contract No. NNC16AA04A and is subject to the provisions of Section 305 of the National Aeronautics and Space Act of 1958 (72 Stat. 435: 42 U.S.C. 2457).

FIELD

The present disclosure relates to variable-porosity panel systems and associated methods.

BACKGROUND

Improvement of aerodynamics as well as performance through the use of passive porosity on aircraft has been demonstrated. Passive porosity refers to applying pores or openings to various locations on the surface of an aircraft to predictably alter or "condition" an airstream boundary layer as air passes over and otherwise impacts the porous aerodynamic surfaces. In the past, the use of passive porosity on aircraft was directed to sets of fixed holes or pores located at various surfaces.

For example, at certain velocities, an airflow or airstream impacts non-porous surfaces existing at various locations on an aircraft surface. Such aircraft surfaces include, for example, an air intake at an engine assembly, or other surfaces including those surfaces considered to be aerodynamic surfaces. At times, including takeoff, acceleration in flight, and landing, for example, airflow impacting aircraft surfaces can cause or exacerbate air turbulence at such surfaces, with such turbulence including, at high-velocities, shockwaves. The porosity of such surfaces is known to impact the interaction of such airflow with aircraft surfaces.

Modern aircraft engine designs are trending toward shorter engine inlets and more compact nacelles for improved aircraft performance. However, this trend may correspond to increased engine noise, as a result of the reduced area for acoustic treatment as well as a lowering of the frequency of the engine noise signature. Although acoustic liners employing passive porosity have been highly effective in mitigating fan noise, such a design represents a compromise for all phases of flight, as blade passage frequency (BPF) tones and the broadband signature will vary as the fan RPM and in-duct flow changes. Thus, as the available area for acoustic treatment in an aircraft engine shrinks, there is a correspondingly increasing value in incorporating acoustic liners that effectively mitigate acoustic noise in all flight conditions.

Shape memory alloys (referred to equivalently herein as "SMAs") are a class of active materials that convert thermal energy into mechanical energy. Heating the material above its austenitic transformation temperature induces a change in the SMA microstructure, known as the Shape Memory Effect (SME), which results in a macroscopic shape change to a stable, defined austenitic shape. When cooled below its transformation temperature, the SMA transforms into its martensitic crystal form. Due to the many variants of crystal structure in the martensitic phase, as the material cools it can be deformed by external loads or internal stresses applied to the material. Thermomechanical processing enables the SMA to recover a defined martensitic shape in addition to the austenitic shape; a property known as the Two-Way-Shape-Memory-Effect (TWSME). This shape change process can be repeated and controlled by managing the SMA temperature. The SMA shape change can be in response to environmental temperature changes, for example, due to a change in aircraft altitude or engine setting, or it can be controlled by direct heating via heaters or electric current. The phase change creates not only a macroscopic shape change but also a change in mechanical and electrical properties, including elastic modulus and electrical resistivity.

SUMMARY

Variable-porosity panel systems and associated methods are disclosed herein. In some examples, a variable-porosity panel system includes a panel assembly with an exterior layer and a sliding layer positioned adjacent to the exterior layer. The exterior layer defines a plurality of exterior layer pores, and the sliding layer defines a plurality of sliding layer pores. The variable-porosity panel system additionally includes a shape memory alloy (SMA) actuator configured to translate the sliding layer relative to the exterior layer along a longitudinal direction to align and misalign the plurality of sliding layer pores with the plurality of exterior layer pores to modulate a porosity of the panel assembly. The SMA actuator includes an SMA element that is operatively coupled to the sliding layer and that is configured to change in length responsive to a change in temperature of the SMA element. The SMA element is configured to exert an actuation force on the sliding layer when the SMA element decreases in length. The sliding layer defines an SMA element receiver that receives a portion of the SMA element, as well as a sliding layer first end and a sliding layer second end spaced apart from the sliding layer first end along the longitudinal direction. The SMA element receiver intersects the sliding layer first end such that the SMA element extends out of the sliding layer only at the sliding layer first end. The SMA actuator is configured to transition the panel assembly among a plurality of panel configurations defined between and including a fully closed configuration, in which the plurality of sliding layer pores is misaligned with the plurality of exterior layer pores, and a fully open configuration, in which the plurality of sliding layer pores is aligned with the plurality of exterior layer pores.

In some examples, a method of operating the variable-porosity panel system includes assembling the variable-porosity panel system and/or transitioning the panel assembly of the variable-porosity panel system among the plurality of panel configurations.

DESCRIPTION

Figure 1:
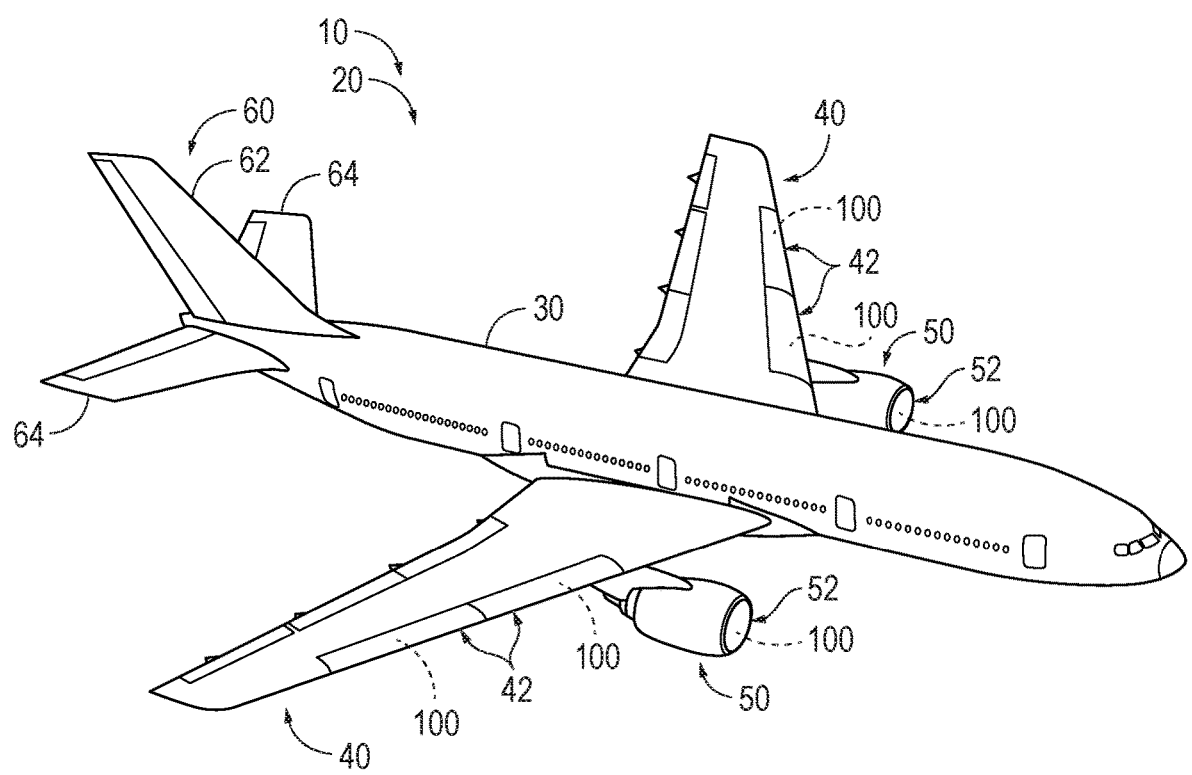
FIG. 1 illustrates an example of a vehicle in the form of an aircraft including examples of variable-porosity panel assemblies according to the present disclosure.

FIGS. 1-16 provide illustrative, non-exclusive examples of variable-porosity panel systems 100, of vehicles 10 including variable-porosity panel systems 100, and/or of methods 300 of operating variable-porosity panel systems 100, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure. Additionally, in some Figures, one or more components and/or portions thereof that are obscured from view also may be illustrated in dashed lines.

FIG. 1 illustrates an example of a vehicle 10 in the form of an aircraft 20 that may utilize and/or incorporate variable-porosity panel systems 100 according to the present disclosure. In particular, in some examples, and as illustrated in FIG. 1, vehicle 10 and/or aircraft 20 includes a fuselage 30 and one or more wings 40 extending from fuselage 30. In some such examples, at least one wing 40 of aircraft 20 includes at least a portion of variable-porosity panel system 100. In particular, in some examples, wing 40 includes a flight control surface 42 that includes at least a portion of variable-porosity panel system 100. Additionally or alternatively, in some examples, and as illustrated in FIG. 1, vehicle 10 and/or aircraft 20 includes an engine 50 configured to accelerate an engine airflow to produce a thrust, and engine 50 includes at least a portion of variable-porosity panel system 100. In particular, in some examples, engine 50 includes an engine inlet 52 for receiving the engine airflow and that includes at least a portion of variable-porosity panel system 100. In various examples, and as illustrated in FIG. 1, vehicle 10 and/or aircraft 20 additionally or alternatively includes a tail assembly 60 with a vertical stabilizer 62 and/or a horizontal stabilizer 64. In such examples, tail assembly 60 and/or any suitable component thereof may include and/or utilize variable-porosity panel system 100.

Figure 2:
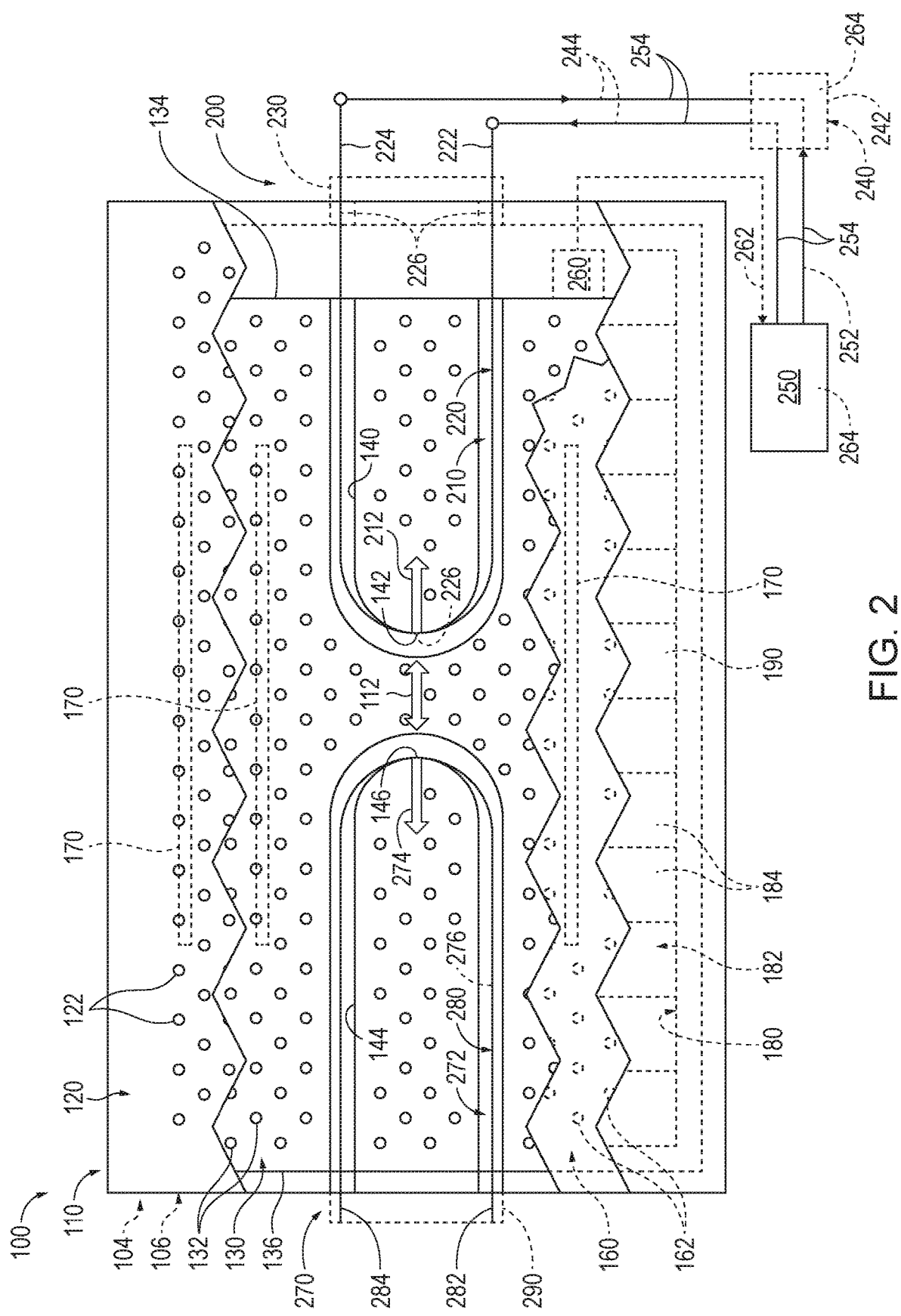
FIG. 2 is a schematic cutaway top plan view representing examples of variable-porosity panel systems according to the present disclosure.
Figure 3:
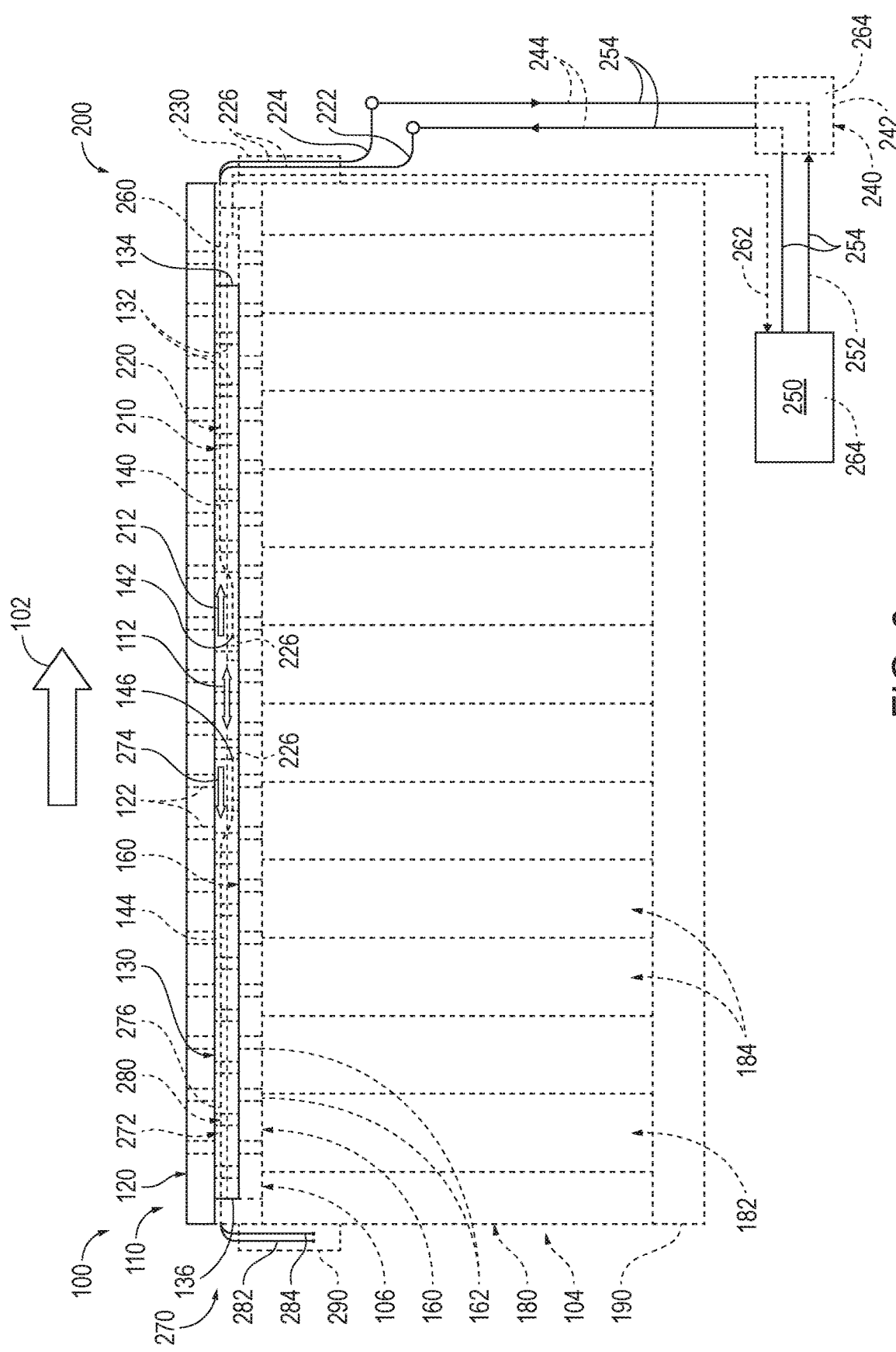
FIG. 3 is a schematic side elevation view representing examples of variable-porosity panel systems according to the present disclosure.
Figure 12:
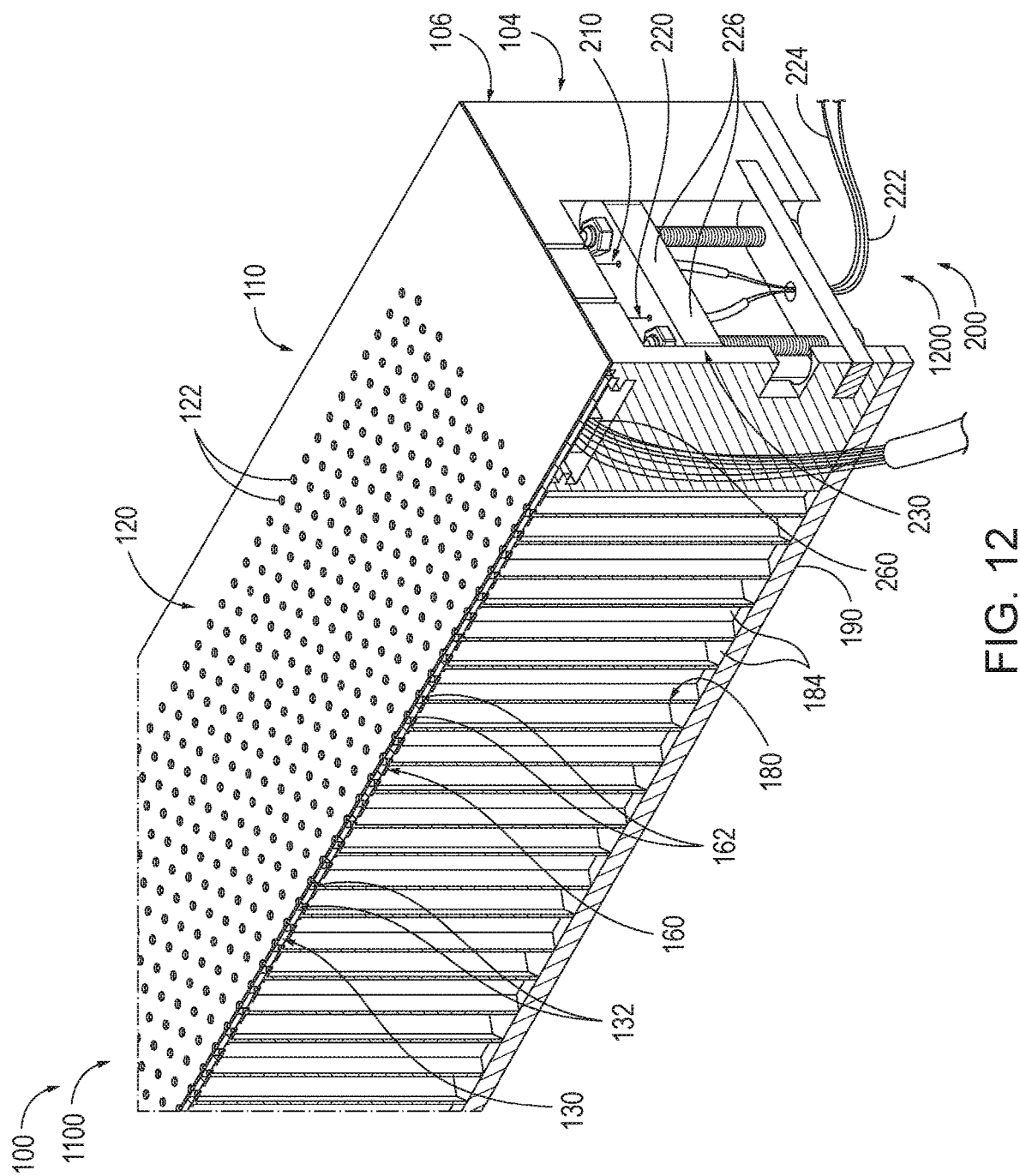
FIG. 12 is a fragmentary cross-sectional top front side isometric view of a portion of the variable-porosity panel system of FIGS. 10-11 with a panel assembly in a partially open configuration according to the present disclosure.
Figure 13:
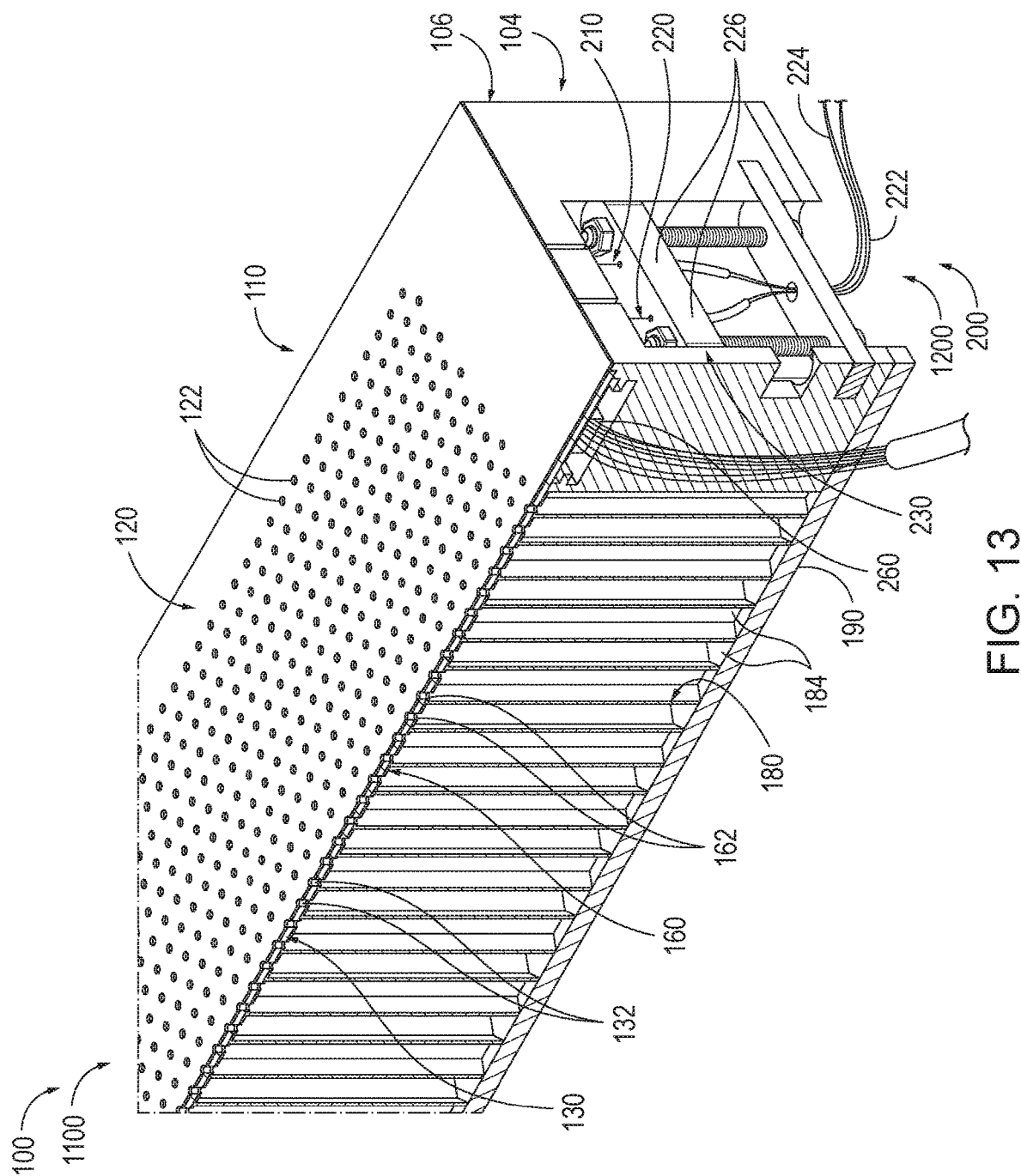
FIG. 13 is a fragmentary cross-sectional top front side isometric view of a portion of the variable-porosity panel system of FIGS. 10-12 with a panel assembly in a fully open configuration according to the present disclosure.
Figure 14:
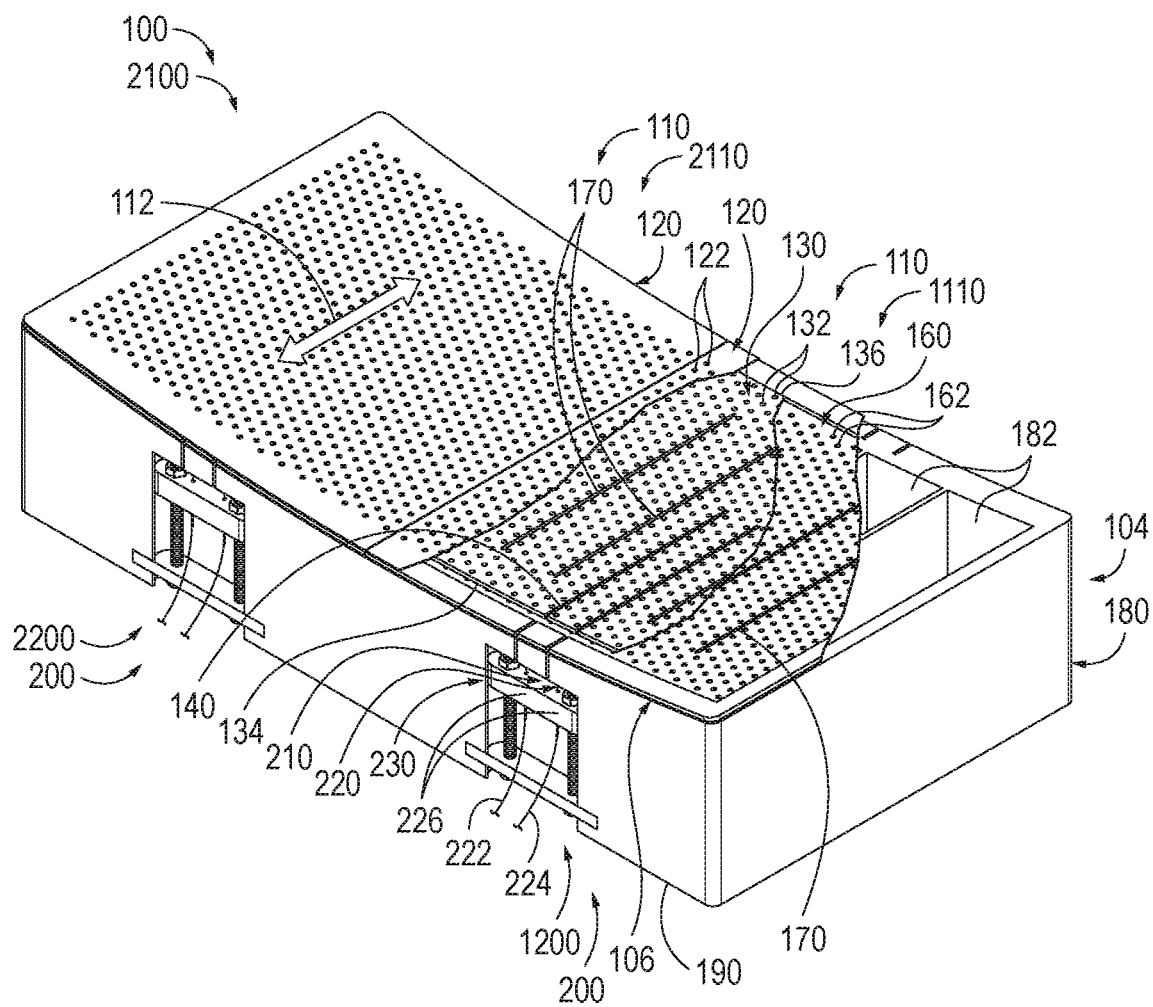
FIG. 14 is a top front side isometric cutaway view of a portion of an example of a variable-porosity panel system that includes a first panel assembly and a second panel assembly according to the present disclosure.
Figure 15:
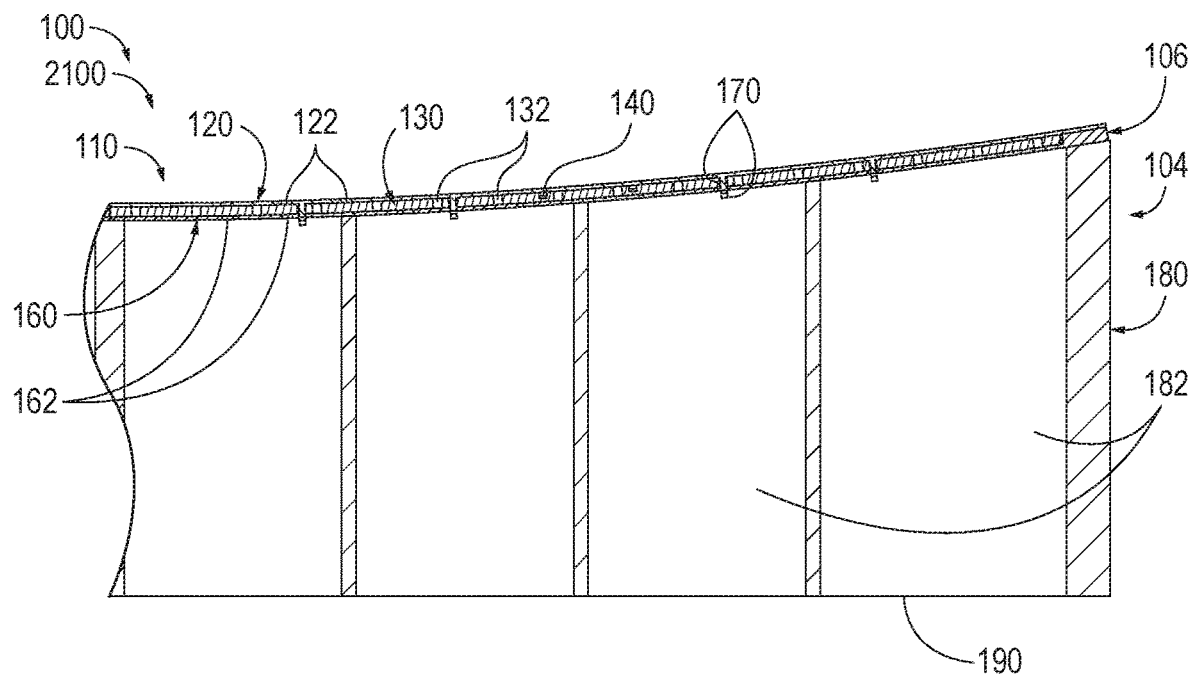
FIG. 15 is a fragmentary cross-sectional front elevation view of a portion of the variable-porosity panel system of FIG. 14.

FIG. 2 is a schematic cutaway top plan view illustrating examples of variable-porosity panel systems 100, while FIG. 3 is a schematic side elevation view illustrating examples of variable-porosity panel systems 100. As discussed in more detail herein, FIGS. 4-9 schematically illustrate further aspects and/or configurations of variable-porosity panel system 100, while FIGS. 10-15 illustrate more specific examples of variable-porosity panel systems 100 and/or components thereof. In particular, FIGS. 10-13 illustrate a first example variable-porosity panel system 1100, while FIGS. 14-15 illustrate a second example variable-porosity panel system 2100, each of which is an example of variable-porosity panel system 100.

As schematically illustrated in FIGS. 2-3, a variable-porosity panel system 100 includes a panel assembly 110 with an exterior layer 120 that defines a plurality of exterior layer pores 122 and a sliding layer 130 that defines a plurality of sliding layer pores 132 and that is positioned adjacent to exterior layer 120. As additionally schematically illustrated in FIGS. 2-3, variable-porosity panel system 100 further includes a shape memory alloy (SMA) actuator 200 that is configured to translate sliding layer 130 relative to exterior layer 120 along a longitudinal direction 112 to align and/or misalign the plurality of sliding layer pores 132 with the plurality of exterior layer pores 122. In this manner, SMA actuator 200 may be described as operating to selectively and/or dynamically vary a porosity of panel assembly 110. In particular, SMA actuator 200 is configured to transition panel assembly 110 among a plurality of panel configurations defined between and including a fully closed configuration, in which the plurality of sliding layer pores 132 is misaligned with the plurality of exterior layer pores 122, and a fully open configuration, in which the plurality of sliding layer pores 132 is aligned with the plurality of exterior layer pores 122. The plurality of panel configurations further may be described as including a plurality of partially open configurations defined between (and excluding) the fully closed configuration and the fully open configuration. In this manner, the porosity of panel assembly 110 may be continuously adjustable as panel assembly 110 is transitioned among the plurality of panel configurations.

As used herein, the term "porosity," as used to describe and/or characterize panel assembly 110, may be understood as referring to a percentage of a surface area of panel assembly 110 that is open to permit a transfer of fluid (e.g., air) through panel assembly 110. Accordingly, panel assembly 110 may be described as having a minimum porosity when in the fully closed configuration and/or a maximum porosity when in the fully open configuration. As more specific examples, the minimum porosity may be 0%, at most 0.1%, at most 0.3%, and/or at most 0.5%. As additional examples, the maximum porosity may be at least 3%, at least 5%, at least 10%, at least 15%, at most 20%, at most 12%, at most 7%, and/or at most 4%.

In an example in which variable-porosity panel system 100 is utilized in conjunction with a component of aircraft 20, such as wing 40, flight control surface 42, engine 50, and/or engine inlet 52, tailoring the impact of an airflow at the surface of the component during flight, takeoff, and/or landing may facilitate mitigating the effects of changing airflow turbulence at a component surface. As examples, tailoring the impact of an airflow at the surface of the component may serve to mitigate the strong transonic or other shocks on wings and other aerodynamic or acoustic surfaces and/or to decrease operational noise, such as in flight and at takeoff and landing, etc. For example, when it is desired to reduce or mitigate the impact and location of shockwaves that would otherwise occur at a non-porous surface, airflow (referred to equivalently herein as "fluid" flow) can be re-directed from a high pressure region to a lower pressure region through the openings and/or pores defined in panel assembly 110 when SMA actuator 200 is activated to transition panel assembly 110 to a configuration other than the fully closed configuration. The redirection of the airflow in this manner energizes the boundary layer, for example, at high angles of attack, and reduces the tendency of a turbulent airflow to separate from, for example, a wing, or other surface that can be an aerodynamic surface. In the case of a wing, the now variably porous wing surface can be adjusted or tailored in real-time to transport high pressure airflow located at the leading wing edge to regions of low pressure at the trailing edge in order to reenergize the boundary layer and improve performance including, for example, delaying stall.

Additionally or alternatively, utilizing variable-porosity panel system 100 in conjunction with a component of aircraft 20 may facilitate mitigating undesirable acoustic noise generated by and/or associated with the component, such as noise generated by engine 50. In many prior art aircraft designs, such acoustic mitigation is accomplished via acoustic liner systems positioned in engine nacelles and/or inlets employing a face sheet with a fixed, or "passive," porosity and overlying an acoustic core, such as an acoustic core that includes a plurality of acoustic and/or honeycomb cells. With modern aircraft designs trending toward shorter engine inlets and more compact nacelles for improved aircraft performance, the available engine area for acoustic treatments such as acoustic liners correspondingly shrinks, thus motivating the development of acoustic treatments with enhanced and/or optimized acoustic performance. For example, the capacity of an acoustic liner to attenuate acoustic noise may be at least partially characterized in terms of a frequency response (e.g., an acoustic impedance) of the acoustic liner, which in turn is at least partially based upon the porosity of the acoustic liner. In prior art designs that employ acoustic liners with passive porosity, the porosity of the acoustic liner thus may represent a compromise to account for the variety of blade passage frequency (BPF) tones and broadband signatures encountered and/or produced during flight, such as may correspond to a fan revolution speed and/or in-duct flow changes. By contrast, utilizing variable-porosity panel system 100 in conjunction with engine 50 may enable the porosity of panel assembly 110 to be dynamically varied during flight in order to dynamically tailor the frequency-dependent acoustic impedance to a specific flight condition. For example, utilizing variable-porosity panel system 100 in conjunction with engine 50 may include selectively and/or dynamically varying the porosity of panel assembly 110 such that variable-porosity panel system 100 is optimally effective at mitigating acoustic noise with a peak frequency and/or frequency spectrum that corresponds to a phase of flight of aircraft 20, a fan speed associated with engine 50, a flow condition through engine 50, etc.

In addition, in an example in which aircraft 20 comprises variable-porosity panel systems 100 and/or panel assemblies 110 at multiple locations over and throughout an aircraft surface, such systems may enable at least substantially simultaneous control of the porosity of various aircraft assemblies and aircraft surfaces located at various locations to achieve a tailored aerodynamic profile for the entire aircraft 20, or for discrete zones of aircraft 20. Accordingly, such porosity and/or the associated aerodynamic profile(s) can change and adapt to changing airflow conditions, and thus can deliver heightened flight efficiency in terms of fuel consumption, aerodynamic performance, propulsion performance, shockwave amelioration (e.g., dampening, etc.), shockwave elimination, decibel reduction, etc. As a more specific example, and in contrast to acoustic liners that have a porosity that is fixed and/or static, aircraft 20 including acoustic liners that incorporate variable-porosity panel systems 100 and/or panel assemblies 110 according to the present disclosure may accomplish a degree of desired noise attenuation, and/or may contribute to the elimination or amelioration of aircraft flight performance inefficiencies, such as due to excessive turbulence or "drag" from disrupted airflow at an aerodynamic surface boundary. During takeoff, landing, and in flight, as airflow and aircraft velocities change, airflow boundary established at an outer substrate surface/airflow interface can deviate from a desired boundary profile, or otherwise change, causing airflow disruption leading to turbulent airflow impacting an otherwise aerodynamic surface. In some such examples, predictably altering the surface porosity of a surface component or assembly in real time, such as by utilizing aspects of variable-porosity panel system 100 disclosed herein, maintains a desired airflow boundary profile.

As described in more detail herein, SMA actuator 200 is configured to utilize the shape memory effect to exert a force on sliding layer 130 to transition panel assembly 110 among the plurality of panel configurations. In particular, and as schematically illustrated in FIGS. 2-5, SMA actuator 200 includes an SMA element 210 that is operatively coupled to sliding layer 130 and that is configured to change in length responsive to a change in temperature of SMA element 210. More specifically, and as schematically illustrated in FIGS. 2-5, SMA element 210 is configured to exert an actuation force 212 on sliding layer 130 when SMA element 210 decreases in length, thereby translating sliding layer 130 relative to exterior layer 120. In particular, and as described in more detail herein, the present disclosure generally relates to examples in which SMA element 210 exerts actuation force 212 on sliding layer 130 as a result of SMA element 210 decreasing in length via the shape memory effect. In some examples, and as schematically illustrated in FIGS. 2-5, SMA actuator 200 is configured such that SMA element 210 exerts actuation force 212 along a direction that is at least substantially parallel to longitudinal direction 112.

Figure 4:
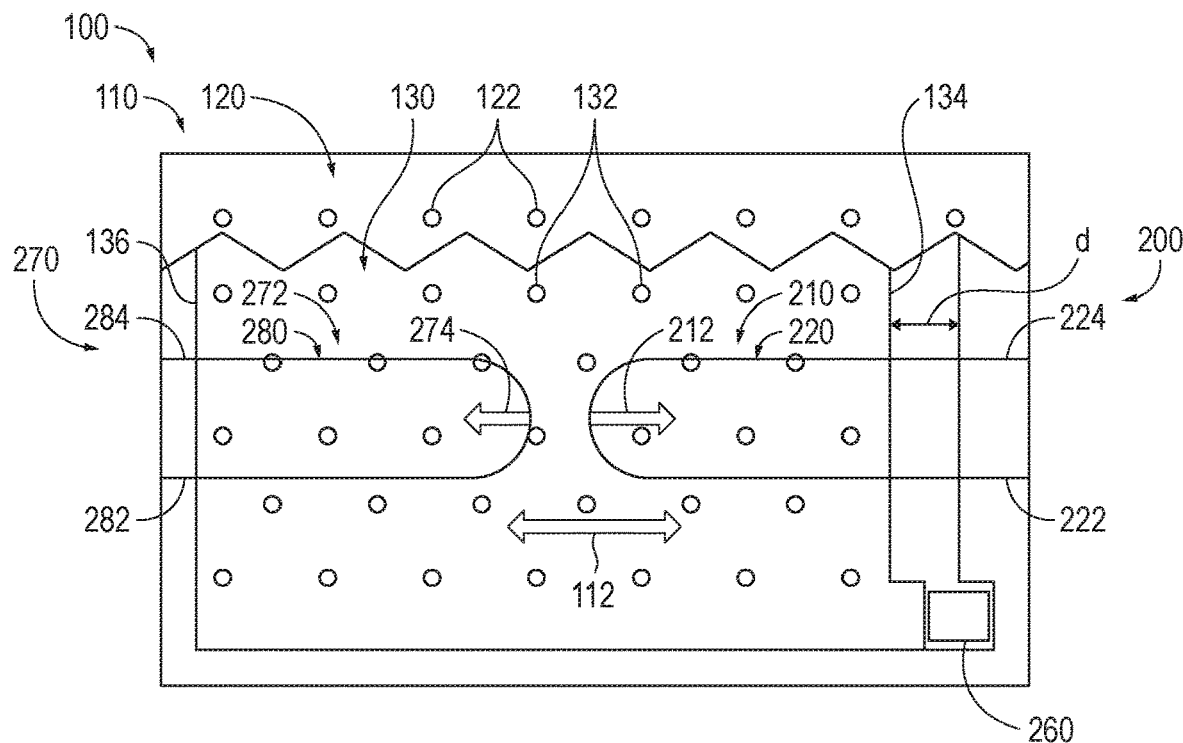
FIG. 4 is a schematic cutaway top plan view representing an example of a variable-porosity panel system with a panel assembly in a fully closed configuration according to the present disclosure.
Figure 5:
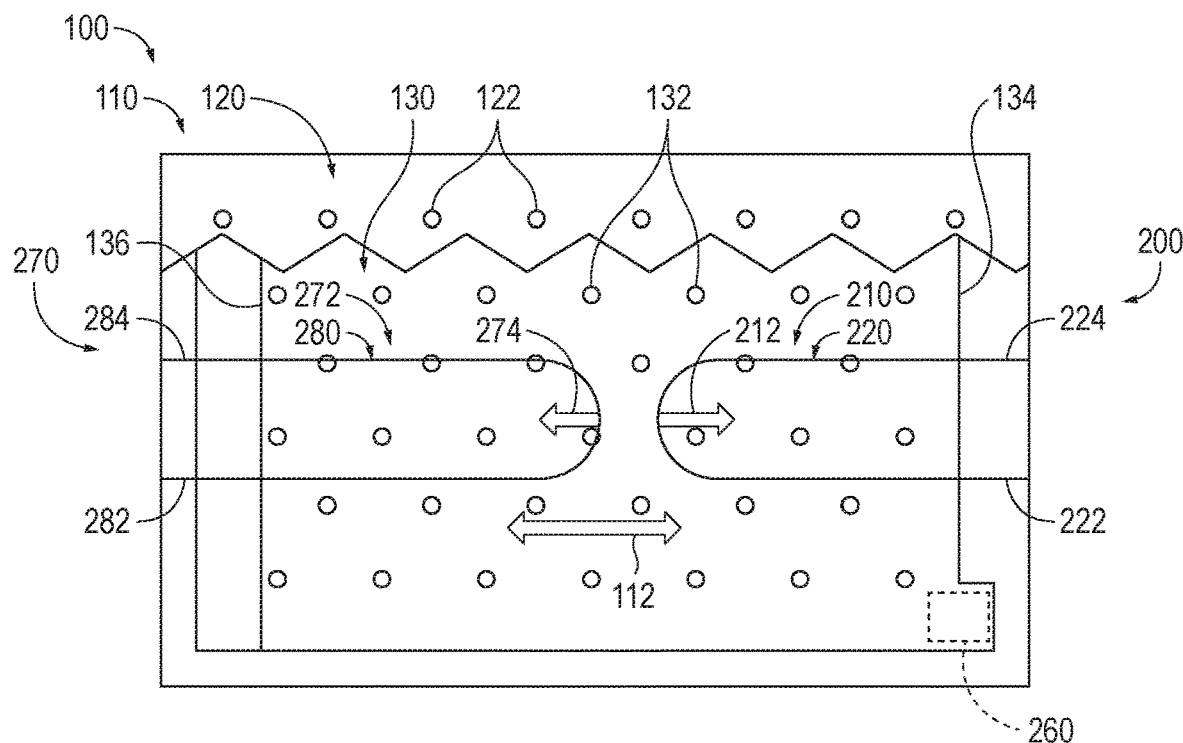
FIG. 5 is a schematic cutaway top plan view representing the variable-porosity panel system of FIG. 4 with the panel assembly in a fully open configuration according to the present disclosure.

FIGS. 4-5 schematically illustrate an example of variable-porosity panel system 100 with panel assembly 110 in the fully closed configuration and in the fully open configuration, respectively. In particular, FIG. 5 schematically illustrates variable-porosity panel system 100 of FIG. 4 subsequent to SMA actuator 200 translating sliding layer 130 to the right relative to its position in FIG. 4. More specifically, and as schematically illustrated in FIGS. 4-5, this translation of sliding layer 130 is actuated by a shortening of SMA element 210 from a non-activated length in the configuration of FIG. 4 to an activated length in the configuration of FIG. 5. As schematically illustrated in FIGS. 4-5, the activated length is less than the non-activated length by 2d, such that sliding layer 130 translates through a distance d as panel assembly 110 transitions from the configuration of FIG. 4 to the configuration of FIG. 5.

As discussed, FIGS. 2-5 schematically illustrate examples in which SMA actuator 200 transitions panel assembly 110 from the fully closed configuration to the fully open configuration responsive to SMA element 210 decreasing in length and thereby exerting actuation force 212 upon sliding layer 130. However, this is not required of all examples of variable-porosity panel system 100, and it additionally is within the scope of the present disclosure that actuating SMA actuator 200 to decrease a length of SMA element 210 may transition panel assembly 110 through and/or to any of a variety of panel configurations. As an example, in some examples, SMA actuator 200 transitions panel assembly 110 from the fully open configuration to the fully closed configuration responsive to SMA element 210 decreasing in length to exert actuation force 212 upon sliding layer 130. Additionally or alternatively, in some examples, actuating SMA actuator 200 to translate sliding layer 130 through a full range of motion thereof (e.g., along a direction parallel to longitudinal direction 112) operates to transition panel assembly 110 through multiple instances of the fully open configuration and/or of the fully closed configuration. Stated differently, in such examples, the fully open configuration and/or the fully closed configuration may not refer to unique respective positions of sliding layer 130 relative to exterior layer 120, but instead may refer to any of a respective plurality of positions of sliding layer 130 that yield the indicated porosity.

As described in more detail herein, variable-porosity panel system 100 is configured such that at least a portion of SMA actuator 200 is received within panel assembly 110. In this manner, variable-porosity panel system 100 may be configured such that incorporation of SMA actuator 200 does not substantially contribute to an overall size of variable-porosity panel system 100 and/or does not significantly affect the aerodynamic properties of panel assembly 110. In particular, and as schematically illustrated in FIGS. 2-3, sliding layer 130 defines an SMA element receiver 140 that receives a portion of SMA element 210. In this manner, SMA element 210 may be described as extending in-plane relative to sliding layer 130 and/or panel assembly 110. Stated differently, in some examples, panel assembly 110 and/or SMA element 210 conforms to a mold line of an outer surface of a part surface, such as a surface of a component of aircraft 20, examples of which include fuselage 30, wing 40, flight control surface 42, a stabilizer, an aileron, a wing flap, engine 50, engine inlet 52, an engine nacelle, etc. To preserve aerodynamic performance of a particular aerodynamic surface, it may be beneficial to configure SMA actuator 200 and/or SMA element 210 to remain "in-plane" with the panel assembly 110 and/or sliding layer 130, and/or to remain in-plane with the mold line. By remaining in-plane with the mold line, even during activation and a change in lengthwise or other dimension, SMA actuator 200 and/or components thereof minimize unwanted disruptions in airflow. In particular, in some examples, SMA actuator 200 performs the function of changing the porosity of panel assembly 110 while remaining immediately proximate to an inner surface of one or more layers of panel assembly 110, and in-plane with the mold line. Accordingly, SMA actuator 200 and/or SMA element 210 does not protrude or deflect away (e.g., to an "out-of-plane" orientation) or otherwise deviate from panel assembly 110, sliding layer 130, and/or SMA element receiver 140, or from the mold line.

SMA element receiver 140 is configured such that SMA element 210 extends from sliding layer 130 only on one side of sliding layer 130. More specifically, and as schematically illustrated in FIGS. 2-3, sliding layer 130 includes a sliding layer first end 134 and a sliding layer second end 136 spaced apart from sliding layer first end 134 along longitudinal direction 112, and SMA element receiver 140 intersects sliding layer first end 134 such that SMA element 210 extends out of sliding layer 130 only at sliding layer first end 134. In this manner, SMA actuator 200 and/or SMA element receiver 140 may be described as being configured to facilitate forming electrical connections with SMA actuator 200 and/or SMA element 210, as described herein.

In various examples, SMA element 210 may be described as extending from sliding layer 130 at sliding layer first end 134 even when SMA element 210 does not intersect a terminal edge of sliding layer first end 134. In particular, in some examples, SMA element 210 may be described as extending from sliding layer 130 at sliding layer first end 134 in any configuration in which SMA element 210 extends from sliding layer 130 at a location that is proximate to sliding layer first end 134 relative to sliding layer second end 136.

In some examples, and as schematically illustrated in FIGS. 2-3 and 6-8 and less schematically illustrated in FIGS. 10-15, panel assembly 110 additionally includes an interior layer 160 that defines a plurality of interior layer pores 162 and that is positioned adjacent to sliding layer 130 such that sliding layer 130 extends between exterior layer 120 and interior layer 160. In some such examples, and as schematically illustrated in FIGS. 3 and 6-8, the plurality of interior layer pores 162 are aligned with the plurality of exterior layer pores 122. Accordingly, in such examples, when the plurality of sliding layer pores 132 are aligned with the plurality of exterior layer pores 122, the plurality of sliding layer pores 132 also are aligned with the plurality of interior layer pores 162. In this manner, descriptions herein of a position and/or configuration of sliding layer 130 relative to exterior layer 120 equivalently may be understood as referring to a position and/or configuration of sliding layer 130 relative to interior layer 160, when present.

Figure 6:
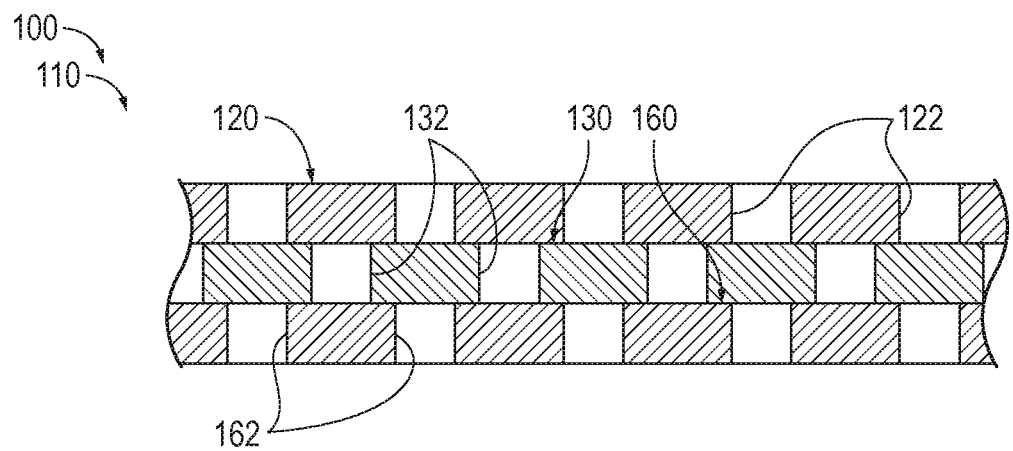
FIG. 6 is a fragmentary cross-sectional side elevation view representing a portion of an example of a panel assembly in a fully closed configuration according to the present disclosure.
Figure 7:
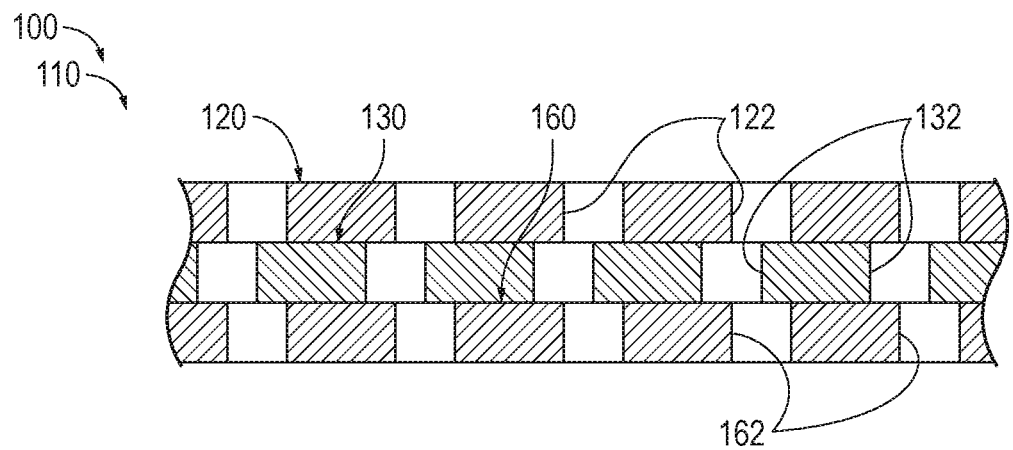
FIG. 7 is a fragmentary cross-sectional side elevation view representing a portion of an example of a panel assembly in a partially open configuration according to the present disclosure.
Figure 8:
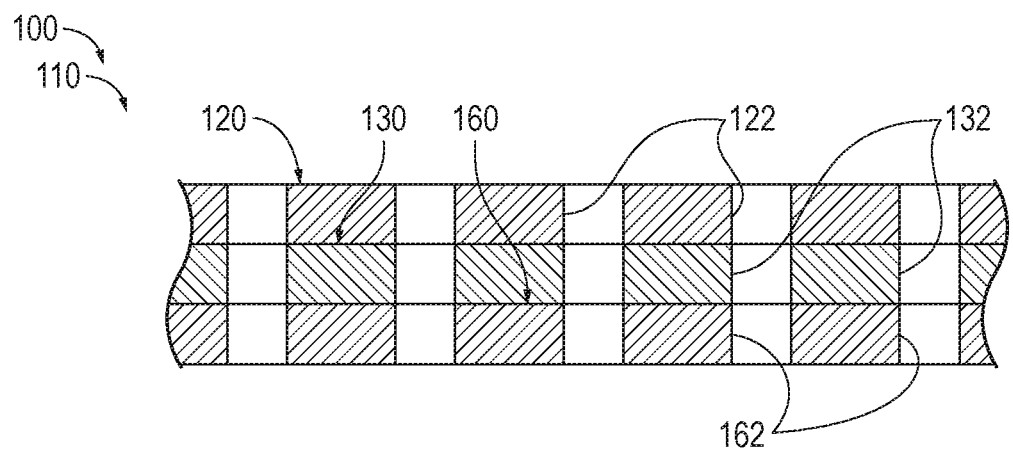
FIG. 8 is a fragmentary cross-sectional side elevation view representing a portion of an example of a panel assembly in a fully open configuration according to the present disclosure.
Figure 11:
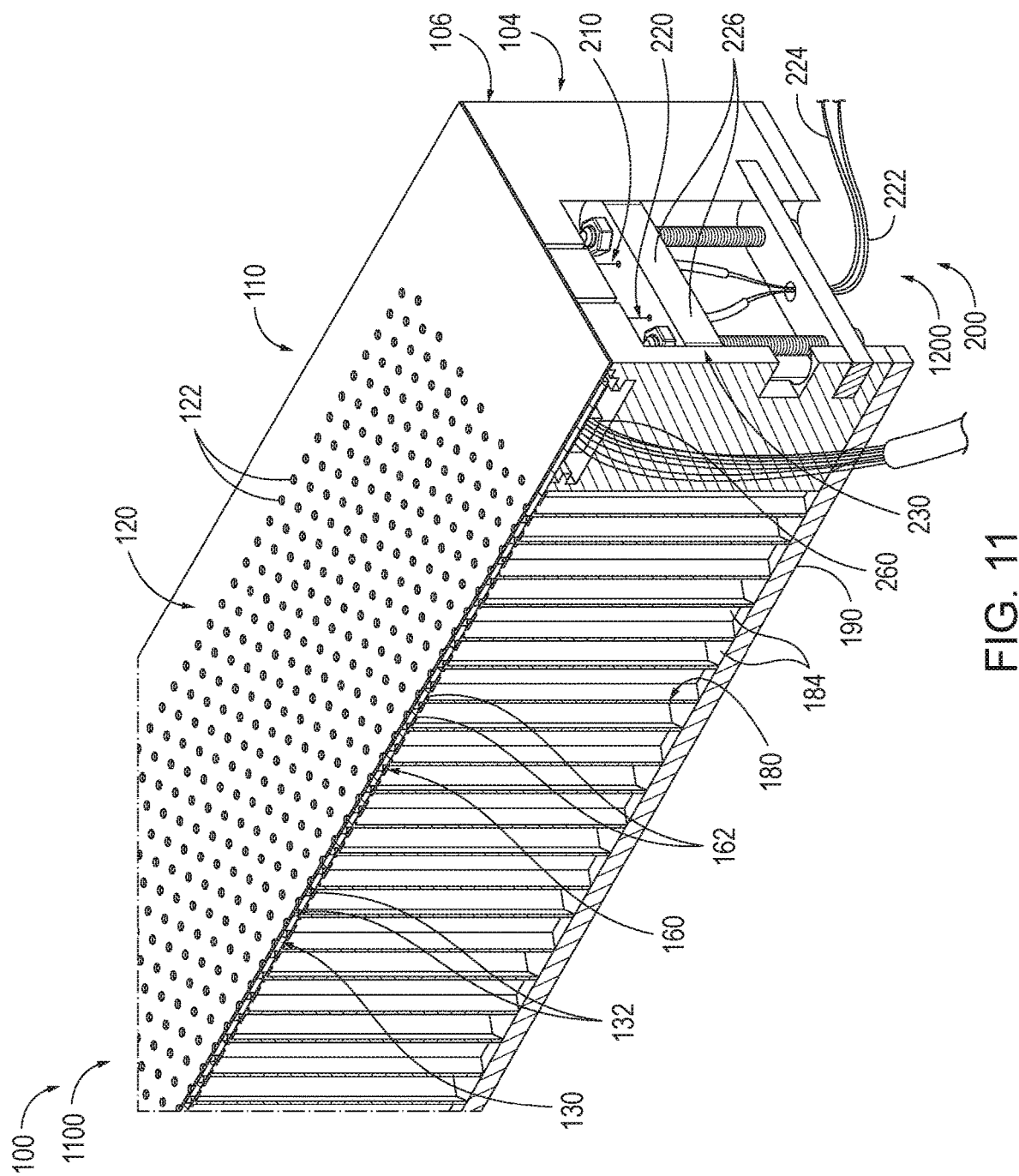
FIG. 11 is a fragmentary cross-sectional top front side isometric view of a portion of the variable-porosity panel system of FIG. 10 with a panel assembly in a fully closed configuration according to the present disclosure.

FIGS. 6-8 are cross-sectional fragmentary side elevation views representing an example of panel assembly 110 that includes interior layer 160 as sliding layer 130 is translated relative to exterior layer 120 and interior layer 160. In particular, FIG. 6 illustrates an example in which panel assembly 110 is in the fully closed configuration, while FIG. 8 illustrates an example in which panel assembly 110 is in the fully open configuration, and FIG. 7 illustrates an example in which panel assembly 110 is in a partially open configuration. Similarly, FIGS. 11-13 are cross-sectional fragmentary front top side isometric views representing panel assembly 110 of first example variable-porosity panel system 1100 in various panel configurations. In particular, FIG. 11 illustrates panel assembly 110 of first example variable-porosity panel system 1100 in the fully closed configuration, FIG. 12 illustrates panel assembly 110 of first example variable-porosity panel system 1100 in a partially open configuration, and FIG. 13 illustrates panel assembly 110 of first example variable-porosity panel system 1100 in the fully open configuration.

The examples discussed and illustrated herein generally relate to examples in which each of the plurality of exterior layer pores 122, the plurality of sliding layer pores 132, and the plurality of interior layer pores 162 are circular in shape, as viewed along a direction perpendicular to panel assembly 110. However, this is not required of all examples of panel assembly 110, and it additionally is within the scope of the present disclosure that each of the plurality of exterior layer pores 122, the plurality of sliding layer pores 132, and/or the plurality of interior layer pores 162 may have any of a variety of cross-sectional shapes, such as a cross-sectional shape that is elliptical, square, rectangular, triangular, elongate along a direction parallel to longitudinal direction 112, and/or elongate along a direction perpendicular to longitudinal direction 112. In particular, configuring the plurality of exterior layer pores 122, the plurality of sliding layer pores 132, and/or the plurality of interior layer pores 162 to have a cross-sectional shape that is elongate along a direction parallel to longitudinal direction 112 may facilitate modulating the porosity of panel assembly 110 with a high degree of precision.

SMA element 210 may include and/or be any of a variety of SMA materials and/or structures for exerting actuation force 212 on sliding layer 130. In various examples, SMA element 210 is formed of any of a variety of known SMA materials, examples of which include an SMA material that includes a nickel titanium alloy; a binary nickel titanium alloy; a ternary alloy comprising nickel and titanium and one or more of hafnium, iron, zirconium, manganese, gold, and platinum; a quaternary alloy comprising nickel and titanium and at least two of hafnium, iron, zirconium, manganese, gold, and platinum; and/or a quaternary alloy comprising nickel, titanium, manganese, and one or more of magnesium, gallium, cobalt, indium, tin, and copper.

As used herein, the term "SMA element" refers equivalently to a component comprised entirely of an SMA material and to a component comprising an SMA material that is combined with a structurally fortifying material that is not an SMA material and that may not itself have SMA characteristics. Examples of such inactive fortifying materials that are thought to remain inactive upon activation of the SMA and into which an SMA can be embedded include aluminum, steel, titanium composite materials including carbon fiber composite materials, plexiglass, etc.

The SMA material that at least partially forms SMA element 210 represents a material of a class of active materials that convert thermal energy into mechanical energy, and/or that undergo a macroscopic deformation in response to an applied strain, based upon a crystalline phase change thereof. In particular, a state of the SMA material may be characterized in terms of a crystalline structure thereof, which may undergo thermally- and/or mechanically-induced transitions between a martensite state and an austenite state. More specifically, heating the SMA material above an austenitic transformation temperature thereof modifies the SMA microstructure to produce the austenite state, which results in a macroscopic shape change to a stable, defined austenitic shape. Alternatively, cooling the SMA material below a martensitic transformation temperature thereof modifies the SMA microstructure to produce the martensite state, which results in a macroscopic shape change to a stable, defined martensite shape. This process represents an example of the shape memory effect (SME).

The phase change of the SMA material between the martensite state and the austenite state yields not only a macroscopic shape change but also a change in mechanical and electrical properties, including elastic modulus and electrical resistivity. Due to the many variants of crystal structure in the martensitic phase, as the SMA material cools it can be deformed by external loads or internal stresses applied to the SMA material. Thermomechanical processing enables the SMA material to recover a defined martensitic shape in addition to the austenitic shape, a property known as the two-way shape memory effect (TWSME). This shape change process can be repeated and controlled by managing the temperature of the SMA material, which in turn may be actively and/or passively modulated, as described herein. Thus, the macroscopic form of the SMA material may vary in response to environmental temperature changes, such as due to a change in aircraft altitude or engine setting, or may vary in response to direct heating via heaters or electric current.

In some examples, and as schematically illustrated in FIGS. 2-3, SMA element 210 includes and/or is an SMA wire 220 that extends between and includes an SMA wire first end 222 and an SMA wire second end 224. Specifically, in such examples, and as schematically illustrated in FIGS. 2-3, each of SMA wire first end 222 and SMA wire second end 224 extends from sliding layer first end 134. In this manner, SMA wire first end 222 and SMA wire second end 224 may correspond to and/or describe the respective portions and/or regions of SMA wire 220 that extend exterior of SMA element receiver 140, or may correspond to the respective regions and/or points at each terminal end of SMA wire 220.

In various examples, SMA wire 220 is configured to vary in length depending upon a temperature thereof. In particular, in some examples, SMA element 210 and/or SMA wire 220 has a first length when a temperature of SMA element 210 is below a threshold deactivated temperature, and SMA element 210 and/or SMA wire 220 has a second length when the temperature of SMA element 210 is above a threshold activated temperature. Specifically, the threshold deactivated temperature may correspond to and/or be the martensitic transformation temperature of the SMA material that forms SMA element 210, while the threshold activated temperature may correspond to and/or be the austenitic transformation temperature of the SMA material that forms SMA element 210. In the examples described herein, the second length is shorter than the first length, such that heating SMA element 210 above the threshold activated temperature operates to shorten SMA wire 220, thereby exerting actuation force 212 on sliding layer 130.

With reference to FIGS. 2-3 and 10-15, variable-porosity panel system 100 may include any of a variety of structures positioned adjacent to panel assembly 110. To clarify the multi-layered construction of various examples of variable-porosity panel system 100, each of FIGS. 2, 10, and 14 includes a plurality of cutaway lines to progressively expose and illustrate the various layers of such structures. In particular, in FIG. 2, the three cutaway lines expose (from top to bottom) exterior layer 120, sliding layer 130, interior layer 160, and a portion of variable-porosity panel system 100 positioned below interior layer 160 (relative to the top-view perspective of FIG. 2). Similarly, in FIG. 10, the two cutaway lines expose (from upper right to lower left) exterior layer 120, sliding layer 130, and interior layer 160. Finally, in FIG. 14, the three cutaway lines expose (from left to right) exterior layer 120, sliding layer 130, interior layer 160, and a portion of variable-porosity panel system 100 positioned below interior layer 160 (relative to the top-front-side perspective of FIG. 14).

In some examples, and as schematically illustrated in FIGS. 2-3 and less schematically illustrated in FIGS. 10-15, variable-porosity panel system 100 includes a core structure 180 positioned adjacent to panel assembly 110. In such examples, core structure 180 is in fluid communication with an environment external to panel assembly 110 via panel assembly 110 when panel assembly 110 is in a panel configuration other than the fully closed configuration. Stated differently, when panel assembly 110 is in a panel configuration such that the plurality of sliding layer pores 132 is at least partially aligned with the plurality of exterior layer pores 122 and/or with the plurality of interior layer pores 162, the plurality of sliding layer pores 132 establish pathways for fluid communication between core structure 180 and the environment external to panel assembly 110.

When present, core structure 180 may include and/or be any of a variety of structures, such as may be configured to mitigate, enhance, and/or otherwise modulate acoustic and/or aerodynamic properties of panel assembly 110. For example, in some examples, and as schematically illustrated in FIGS. 2-3 and less schematically illustrated in FIGS. 14-15, core structure 180 defines, includes, and/or is a plenum 182 such that panel assembly 110 is configured to passively transfer air through plenum 182 when panel assembly 110 is in a panel configuration other than the fully closed configuration. More specifically, in some such examples, plenum 182 may be configured to operate as a recirculation chamber to permit movement of fluid (e.g., air) from a high pressure area exterior of variable-porosity panel system 100 to a lower pressure area exterior of variable-porosity panel system 100.

Additionally or alternatively, in some examples, and as schematically illustrated in FIGS. 2-3 and less schematically illustrated in FIGS. 10-13, core structure 180 defines, includes, and/or is a plurality of acoustic cells 184, such as honeycomb cells. More specifically, in some such examples, the plurality of acoustic cells 184 is configured to attenuate acoustic noise associated with an air flow 102 (schematically illustrated in FIG. 3) that flows adjacent to panel assembly 110 when panel assembly 110 is in a panel configuration other than the fully closed configuration.

In some examples, and as schematically illustrated in FIG. 3 and less schematically illustrated in FIGS. 10-15, variable-porosity panel system 100 additionally includes a backplate 190 that at least partially covers core structure 180. In such examples, backplate 190 thus may cover plenum 182 and/or the plurality of acoustic cells 184, when present.

Exterior layer 120, sliding layer 130, and/or interior layer 160 may be operatively coupled to one another and/or supported relative to one another in any of a variety of manners. In particular, in some examples, interior layer 160 and exterior layer 120 are secured in a fixed orientation relative to one another, are directly coupled to one another, and/or are integrally formed with one another. For example, exterior layer 120, sliding layer 130, and/or interior layer 160 may be operatively coupled to one another in a manner that restricts sliding layer 130 from translating relative to exterior layer 120 and/or interior layer 160 along a direction other than longitudinal direction 112. In particular, in some examples, and as schematically illustrated in FIG. 2 and less schematically illustrated in FIGS. 14-15, exterior layer 120, sliding layer 130, and/or interior layer 160 includes one or more slide tracks 170 configured to constrain sliding layer 130 to translate relative to exterior layer 120 and/or interior layer 160 along longitudinal direction 112. In some such examples, sliding layer 130 includes a respective slide track 170 that extends along longitudinal direction 112 and that engages and/or mates with a respective slide track 170 of one or both of exterior layer 120 and interior layer 160.

In some examples, and as schematically illustrated in FIGS. 2-3 and less schematically illustrated in FIGS. 10-15, variable-porosity panel system 100 additionally includes a panel system base 104 that is operatively coupled to at least a portion of panel assembly 110. Additionally or alternatively, in some examples, and as schematically illustrated in FIGS. 2-3 and less schematically illustrated in FIGS. 10-15, variable-porosity panel system 100 includes a panel assembly support 106 that supports at least a portion of panel assembly 110, such as relative to panel system base 104. In particular, in some examples, panel assembly support 106 includes, defines, and/or is integrally formed with interior layer 160 and/or exterior layer 120, and sliding layer 130 is operatively coupled to, at least partially enclosed within, and/or supported by panel assembly support 106. In some such examples, such as in second example variable-porosity panel system 2100 illustrated in FIGS. 14-15, panel assembly 110 includes panel assembly support 106 and sliding layer 130 and is operatively coupled to panel system base 104 to assemble variable-porosity panel system 100.

In various examples, panel system base 104 includes, defines, and/or is integrally formed with panel assembly support 106, core structure 180, backplate 190, plenum 182, and/or the plurality of acoustic cells 184. Additionally or alternatively, in some examples, panel system base 104 includes, defines, and/or is integrally formed with a portion of panel assembly 110 such as exterior layer 120 and/or interior layer 160. Additionally or alternatively, in various examples, panel assembly support 106 includes, defines, and/or is integrally formed with at least a portion of panel system base 104, exterior layer 120, core structure 180, backplate 190, plenum 182, and/or the plurality of acoustic cells 184. As a more specific example, FIGS. 10-13 illustrate an example in which panel system base 104 is integrally formed with panel assembly support 106 and interior layer 160 and defines the plurality of acoustic cells 184, and in which backplate 190 is operatively coupled to panel system base 104. As another example, FIGS. 14-15 illustrate an example in which panel system base 104 is integrally formed with backplate 190, in which panel assembly support 106 is operatively coupled to panel system base 104, and in which panel assembly support 106 is integrally formed with interior layer 160.

In some examples, and as schematically illustrated in FIGS. 2-3 and less schematically illustrated in FIGS. 10-15, panel assembly 110 is at least substantially flat. Stated differently, in such examples, panel assembly 110 extends at least substantially within and/or parallel to a common plane. However, this is not required of all examples of variable-porosity panel system 100, and it additionally is within the scope of the present disclosure that panel assembly 110 is curved. For example, FIGS. 14-15 illustrate an example in which panel assembly 110 is curved through a single direction of curvature that is at least substantially perpendicular to longitudinal direction 112.

Exterior layer 120, sliding layer 130, and/or interior layer 160 each may be formed of any of a variety of materials. In particular, in various examples, each of exterior layer 120, sliding layer 130, and interior layer 160 is formed of a metal, aluminum, an aluminum alloy, titanium, a titanium alloy, a non-metal, a ceramic material, a composite material, a carbon fiber reinforced plastic, a boron fiber reinforced plastic, and/or an aramid fiber reinforced plastic. Additionally or alternatively, in some examples, exterior layer 120, sliding layer 130, and/or interior layer 160 are formed via an additive manufacturing technique.

Figure 9:
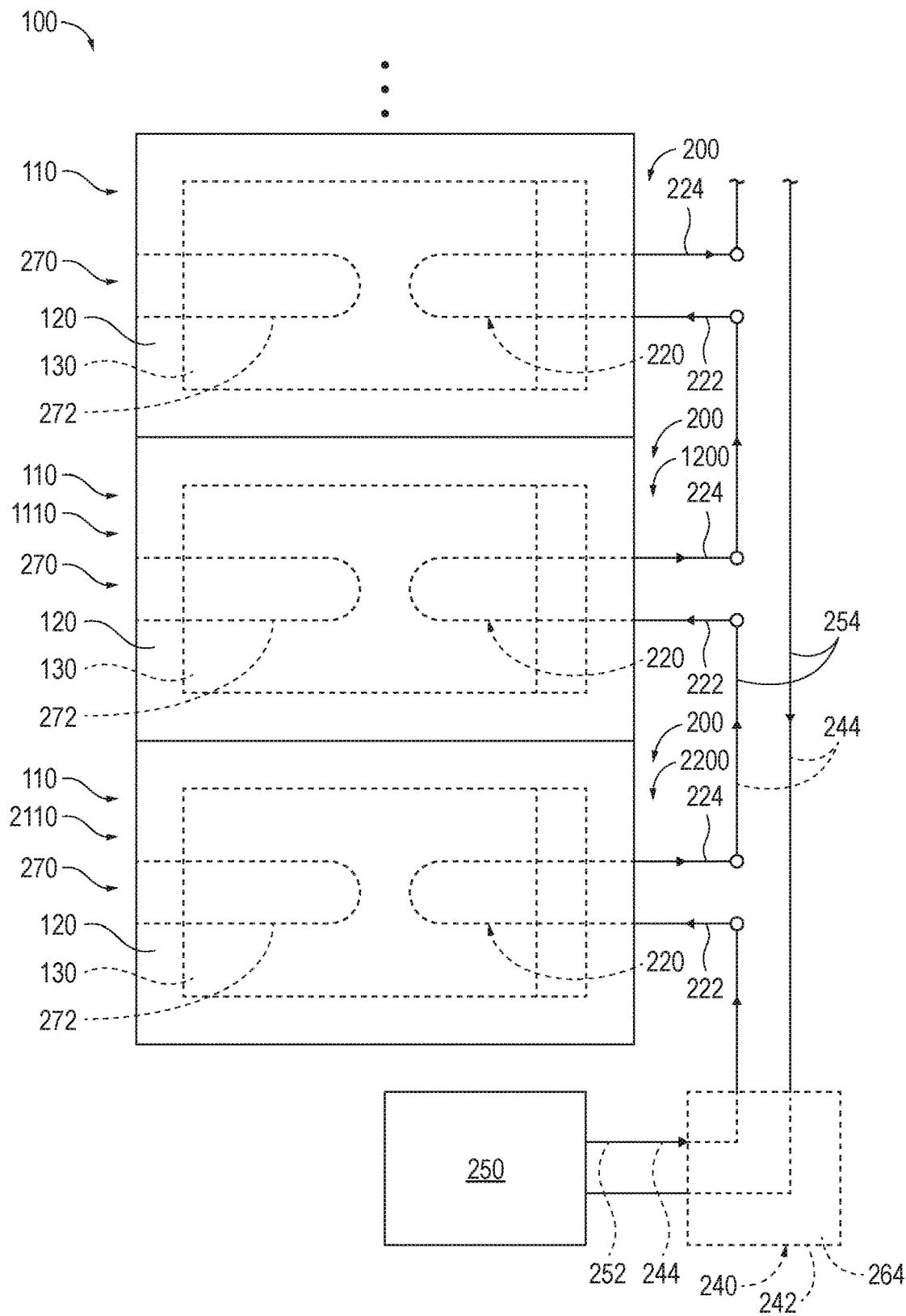
FIG. 9 is a schematic top plan view representing an example of a variable-porosity panel system including a plurality of panel assemblies according to the present disclosure.
Figure 10:
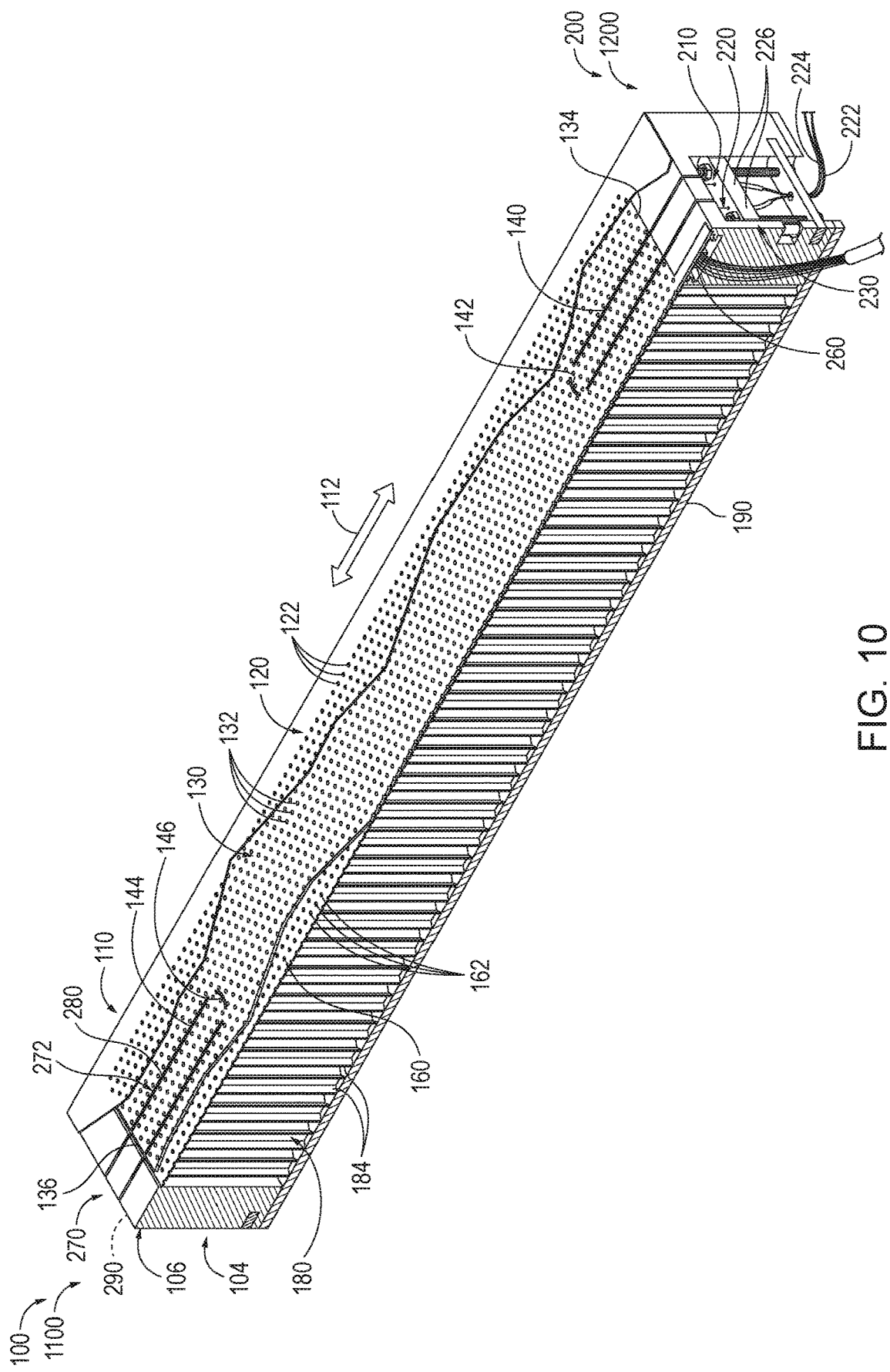
FIG. 10 is a cross-sectional top front side isometric cutaway view of an example of a portion of a variable-porosity panel system according to the present disclosure.

Returning to the mechanism of SMA actuator 200, variable-porosity panel system 100 may be configured to vary the temperature of SMA element 210 in any of a variety of manners, such as via any of a variety of active and/or passive mechanisms. In some examples, and as schematically illustrated in FIGS. 2-3 and 9, SMA actuator 200 includes an SMA heat source 240 configured to selectively increase the temperature of SMA element 210. SMA heat source 240 may include and/or be any of a variety of structures and/or devices, such as an electrical current source 242 that is configured to convey an electrical current 244 through SMA element 210. In particular, in some such examples, and as schematically illustrated in FIGS. 2-3 and 9, electrical current source 242 is configured to convey electrical current 244 between SMA wire first end 222 and SMA wire second end 224 so as to selectively increase the temperature of SMA element 210 via resistive heating. When present, electrical current source 242 may include and/or be any suitable device for producing electrical current 244, such as a direct current (DC) source and/or an alternating current (AC) source.

In some examples, and as schematically illustrated in FIGS. 2-3, SMA wire 220 is fixedly coupled to one or more other components of variable-porosity panel system 100 at one or more SMA wire anchor points 226. More specifically, in some examples, and as schematically illustrated in FIGS. 2-3, SMA wire first end 222 and/or SMA wire second end 224 is fixedly coupled to a portion of variable-porosity panel system 100 exterior of sliding layer 130 at one or more SMA wire anchor points 226. In some such examples, panel system base 104 and/or panel assembly support 106 includes at least one of the one or more SMA wire anchor points 226. Accordingly, in such examples, decreasing a length of SMA wire 220 that extends through SMA element receiver 140 while SMA wire first end 222 and/or SMA wire second end 224 are held fixed relative to another component of panel assembly 110 operates to exert actuation force 212 on sliding layer 130, as described herein.

As discussed, SMA element 210 and/or SMA wire 220 is configured to exert actuation force 212 on sliding layer 130 to translate sliding layer 130 relative to exterior layer 120 along longitudinal direction 112. However, in some examples, SMA element 210 and/or SMA wire 220 is operable to translate sliding layer 130 primarily and/or only in the direction of actuation force 212; that is, in the direction directed from sliding layer second end 136 toward sliding layer first end 134. That is, in some examples, SMA element 210 is not effectively and/or efficiently operable to translate sliding layer 130 along longitudinal direction 112 in the direction opposite actuation force 212, even when SMA element 210 and/or SMA wire 220 returns to the first length. Accordingly, in some examples, and as schematically illustrated in FIGS. 2-3, SMA actuator 200 additionally includes an actuator return mechanism 270 that is operatively coupled to sliding layer 130 and that is configured to exert a return force 274, which is opposed to actuation force 212, on sliding layer 130. In particular, in some such examples, actuator return mechanism 270 is configured to exert return force 274 along a direction that is at least substantially parallel to longitudinal direction 112 and/or to a direction along which SMA element 210 exerts actuation force 212.

Actuator return mechanism 270 may include any of a variety of structures and/or mechanisms for exerting return force 274 on sliding layer 130. In particular, in some examples, and as schematically illustrated in FIGS. 2-3, actuator return mechanism 270 includes a biasing member 272 that passively exerts return force 274 on sliding layer 130. In such examples, biasing member 272 may be operatively coupled to sliding layer second end 136 of sliding layer 130, and/or may be operatively coupled to sliding layer 130 such that biasing member 272 extends from sliding layer second end 136.

In some examples, and as schematically illustrated in FIGS. 2-5, biasing member 272 includes and/or is a superelastic SMA wire 280 that extends between and includes a superelastic wire first end 282 and a superelastic wire second end 284. In some such examples, and as schematically illustrated in FIGS. 2-5, each of superelastic wire first end 282 and superelastic wire second end 284 extends from sliding layer second end 136. Additionally or alternatively, in some examples, and as schematically illustrated in FIGS. 2-3, sliding layer 130 defines a biasing member receiver 144 that receives a portion of biasing member 272. In some such examples, biasing member receiver 144 intersects sliding layer second end 136 such that biasing member 272 extends out of sliding layer 130 only at and/or proximate to sliding layer second end 136. More specifically, in some such examples, and when biasing member 272 includes superelastic SMA wire 280, each of superelastic wire first end 282 and superelastic wire second end 284 extends out of biasing member receiver 144 at and/or proximate to sliding layer second end 136.

As used herein, the terms "superelastic," "superelastic SMA," "superelastic wire," and the like are intended to refer to components that utilize and/or exhibit superelastic properties of SMA materials. As discussed herein, certain SMA materials exhibit the shape memory effect in that the microstructure of the SMA material transitions between the austenitic phase and the martensitic phase depending upon a temperature of the SMA material. In the case of SMA wire 220, such a phase change may result in a shortening of SMA wire 220, thereby enabling SMA actuator 200 to exert actuation force 212 upon sliding layer 130. However, in some examples, an SMA material additionally or alternatively may be configured to transition between the austenitic phase and the martensitic phase responsive to an applied stress and/or at a temperature that is at least substantially constant. This property may be referred to as superelasticity and/or pseudoelasticity. In some such examples, when a tensile stress is applied to a superelastic material such as superelastic SMA wire 280, the superelastic material elastically lengthens as the SMA material transitions between the austenitic and martensitic phases and resiliently returns to its initial length when the tensile stress is removed. Accordingly, and with reference to FIGS. 2-5, in an example in which biasing member 272 includes superelastic SMA wire 280, and when SMA element 210 contracts to translate sliding layer 130 from the configuration of FIG. 4 to the configuration of FIG. 5, engagement between superelastic SMA wire 280 and biasing member receiver 144 (illustrated in FIGS. 2-3) operates to lengthen superelastic SMA wire 280, thereby exerting return force 274 upon sliding layer 130. Thus, when SMA element 210 is returned to a temperature below the threshold activated temperature and/or the threshold deactivated temperature, return force 274 operates to return sliding layer 130 to the configuration of FIG. 4.

In some examples, superelastic SMA wire 280 and SMA element 210 are formed of similar, or the same, materials. In particular, in some examples, a given (e.g., a particular) SMA material may exhibit both the thermally-activated shape memory effect and superelasticity in respective circumstances, with each effect producing respective forces of similar magnitudes and/or yielding macroscopic strains of similar degrees. Accordingly, in some examples, configuring SMA element 210 and superelastic SMA wire 280 to be formed of a common SMA material yields a system in which each of SMA element 210 and superelastic SMA wire 280 expands and contracts in length by similar degrees and/or exerts similar forces upon sliding layer 130, thus operating to translate sliding layer 130 along respective directions in a balanced and stable manner.

While the present disclosure generally relates to examples in which biasing member 272 includes superelastic SMA wire 280, this is not required of all examples of biasing member 272, and it additionally is within the scope of the present disclosure that biasing member 272 includes any suitable additional or alternative components for exerting return force 274. For example, in some examples, and as schematically illustrated in FIGS. 2-3, biasing member 272 includes and/or is a spring 276, such as a constant-force spring 276.

In some examples, SMA actuator 200 includes one or more structures and/or mechanisms for adjusting and/or calibrating actuation force 212 and/or return force 274. In particular, in some examples, actuation force 212 and/or return force 274 may be at least partially based upon material properties and/or dimensions of SMA element 210 and/or biasing member 272, respectively. However, providing a mechanism for fine-tuning the forces applied by SMA element 210 and/or biasing member 272 may enable and/or facilitate ensuring that actuation force 212 and/or return force 274 have suitable respective and/or relative magnitudes during operative use of variable-porosity panel system 100. Accordingly, in some examples, and as schematically illustrated in FIGS. 2-3 and less schematically illustrated in FIGS. 10-14, SMA actuator 200 includes an adjustable actuation tension mechanism 230 that is configured to apply a tension force to SMA element 210 that is at least substantially constant during operative use of variable-porosity panel system 100. In some such examples, adjustable actuation tension mechanism 230 is configured to be selectively adjusted to adjust a magnitude of the tension force applied to SMA element 210, thereby adjusting the magnitude of actuation force 212. Stated differently, in some such examples, the tension force applied by adjustable actuation tension mechanism 230 represents a component of actuation force 212.

Adjustable actuation tension mechanism 230 may be operatively coupled to SMA element 210 and/or to panel assembly 110 in any of a variety of manners. In some examples, adjustable actuation tension mechanism 230 is operatively and/or fixedly coupled to SMA wire 220, for example such that adjustable actuation tension mechanism 230 includes and/or defines one or more SMA wire anchor points 226. Additionally or alternatively, in some examples, adjustable actuation tension mechanism 230 is fixedly coupled to a portion of variable-porosity panel system 100, such as to panel system base 104, panel assembly support 106, panel assembly 110, exterior layer 120, and/or interior layer 160.

While FIGS. 2-3 schematically illustrate adjustable actuation tension mechanism 230 as being positioned exterior of panel system base 104 for clarity, this is not required of all examples of SMA actuator 200, and it additionally is within the scope of the present disclosure that adjustable actuation tension mechanism 230 is at least partially enclosed by panel system base 104, panel assembly support 106, and/or panel assembly 110. In particular, FIGS. 10-14 illustrate examples in which adjustable actuation tension mechanism 230 is at least partially received within panel system base 104, such that incorporation of adjustable actuation tension mechanism 230 does not substantially increase a geometrical dimension of variable-porosity panel system 100.

Similarly, in some examples, and as schematically illustrated in FIGS. 2-3, SMA actuator 200 includes an adjustable return tension mechanism 290 that is configured to apply a tension force to biasing member 272 and/or sliding layer 130 that is at least substantially constant during operative use of variable-porosity panel system 100. In some such examples, adjustable return tension mechanism 290 is configured to be selectively adjusted to adjust a magnitude of the tension force applied to biasing member 272 and/or sliding layer 130, thereby adjusting the magnitude of return force 274. Stated differently, in some such examples, the tension force applied by adjustable return tension mechanism 290 represents a component of return force 274.

Adjustable return tension mechanism 290 may be operatively coupled to biasing member 272 and/or to panel assembly 110 in any of a variety of manners. In some examples, adjustable return tension mechanism 290 is operatively and/or fixedly coupled to superelastic SMA wire 280. Additionally or alternatively, in some examples, adjustable return tension mechanism 290 is fixedly coupled to a portion of variable-porosity panel system 100, such as to panel system base 104, panel assembly support 106, panel assembly 110, exterior layer 120, and/or interior layer 160.

While FIGS. 2-3 schematically illustrate adjustable return tension mechanism 290 as being positioned exterior of panel system base 104 for clarity, this is not required of all examples of SMA actuator 200, and it additionally is within the scope of the present disclosure that adjustable return tension mechanism 290 is at least partially enclosed by panel system base 104, panel assembly support 106, and/or panel assembly 110. In particular, in some examples, adjustable return tension mechanism 290 is at least partially received within panel system base 104 in a similar manner as adjustable actuation tension mechanism 230 illustrated in FIGS. 10-14. Accordingly, in such examples, incorporation of adjustable return tension mechanism 290 does not substantially increase a geometrical dimension of variable-porosity panel system 100.

When present, each of SMA element receiver 140 and/or biasing member receiver 144 may have any of a variety of forms, structures, and/or configurations. In some examples, SMA element receiver 140 and/or biasing member receiver 144 includes and/or is a groove, a channel, and/or a tunnel. Additionally or alternatively, in some examples, and as schematically illustrated in FIGS. 2-3, SMA element receiver 140 and/or biasing member receiver 144 is at least partially U-shaped. In some examples, and as schematically illustrated in FIG. 3 and less schematically illustrated in FIGS. 10 and 14, each of SMA element receiver 140 and/or biasing member receiver 144 is open to exterior layer 120 and/or to interior layer 160 at various points along a length thereof.

In some examples, the form and/or configuration of SMA element receiver 140 and/or of biasing member receiver 144 is configured to facilitate exerting actuation force 212 and/or return force 274 upon sliding layer 130. In particular, in some examples, and as schematically illustrated in FIGS. 2-3, SMA element 210 is configured to engage SMA element receiver 140 and to exert at least a portion of actuation force 212 on sliding layer 130 at an SMA element engagement point 142. In some such examples, SMA element 210 is fixedly coupled to sliding layer 130 at SMA element engagement point 142, such as with an adhesive. However, this is not required of all examples of SMA actuator 200, and it additionally is within the scope of the present disclosure that SMA element 210 is configured to slidingly engage sliding layer 130 at SMA element engagement point 142.

Similarly, in some examples, and as schematically illustrated in FIGS. 2-3, biasing member 272 is configured to engage biasing member receiver 144 and to exert at least a portion of return force 274 on sliding layer 130 at a biasing member engagement point 146. In some such examples, biasing member 272 is fixedly coupled to sliding layer 130 at biasing member engagement point 146, such as with an adhesive. However, this is not required of all examples of SMA actuator 200, and it additionally is within the scope of the present disclosure that biasing member 272 is configured to slidingly engage sliding layer 130 at biasing member engagement point 146.

In various examples, each of SMA element engagement point 142 and biasing member engagement point 146 is a single point of contact or a region of engagement, such as may include and/or be a region along which SMA element 210 and/or biasing member 272 is adhered to sliding layer 130. In particular, in some examples, configuring SMA element receiver 140 to be at least partially U-shaped results in SMA element engagement point 142 extending along a curved portion of SMA element receiver 140, thus enabling SMA element 210 to exert actuation force 212 upon sliding layer 130 across a wide extent of SMA element receiver 140. Similarly, in some examples, configuring biasing member receiver 144 to be at least partially U-shaped results in biasing member engagement point 146 extending along a curved portion of biasing member receiver 144, thus enabling biasing member 272 to exert return force 274 upon sliding layer 130 across a wide extent of biasing member receiver 144. In some examples, and as schematically illustrated in FIG. 2, SMA element engagement point 142 and biasing member engagement point 146 are at least substantially aligned with one another along longitudinal direction 112. Stated differently, in such examples, SMA element engagement point 142 and biasing member engagement point 146 may be described as being collinear with one another along a line that extends at least substantially parallel to longitudinal direction 112.

As discussed, in some examples, SMA actuator 200 operates to transition panel assembly 110 among the plurality of panel configurations by modulating the temperature of SMA element 210, such as with SMA heat source 240 and/or electrical current source 242. In such examples, the temperature of SMA element 210 may be varied and/or regulated in any of a variety of manners. In particular, in some examples, and as schematically illustrated in FIGS. 2-3, variable-porosity panel system 100 includes an actuator controller 250 that is programmed to selectively change and/or regulate the temperature of SMA element 210 to selectively and dynamically transition panel assembly 110 among the plurality of panel configurations. More specifically, in some such examples, and as schematically illustrated in FIGS. 2-3, actuator controller 250 is configured to generate an actuator control signal 252 and to transmit actuator control signal 252 to SMA element 210 and/or to SMA heat source 240. In some examples, actuator controller 250 includes and/or is SMA heat source 240 and/or electrical current source 242.

Actuator control signal 252 may include and/or be any of a variety of signals, such as an electrical signal and/or an electromagnetic signal. As a more specific example, in some examples in which electrical current source 242 is configured to convey electrical current 244 through SMA element 210, actuator control signal 252 includes and/or is a command to SMA heat source 240 and/or to electrical current source 242 to generate electrical current 244, or includes and/or is electrical current 244 itself. Additionally or alternatively, in some examples, actuator control signal 252 includes and/or is a pulse-width-modulated electrical signal.

In various examples, and as schematically illustrated in FIGS. 2-3, SMA actuator 200 includes one or more electrical leads 254 such that actuator controller 250 is electrically coupled to SMA element 210 and/or to SMA heat source 240 via electrical leads 254. In some such examples, electrical leads 254 are configured to convey actuator control signal 252 from actuator controller 250 to SMA element 210 and/or to SMA heat source 240.

In some examples, control of SMA actuator 200 (such as via actuator controller 250) utilizes a feedback mechanism for precise positioning of sliding layer 130 relative to exterior layer 120. In particular, in some examples, and as schematically illustrated in FIGS. 2-5, SMA actuator 200 includes a position sensor 260 that is configured to generate a position sensor signal 262 (schematically illustrated in FIGS. 2-3) that at least partially represents a linear position of sliding layer 130 relative to exterior layer 120. In such examples, position sensor 260 is configured to transmit position sensor signal 262 to actuator controller 250, which in turn is programmed to generate actuator control signal 252 at least partially based upon position sensor signal 262. In this manner, actuator controller 250 may be programmed to generate actuator control signal 252 such that actuator control signal 252 is based not only upon an intended and/or target position of sliding layer 130 but also on a measured actual position of sliding layer 130, thereby enabling sliding layer 130 to be positioned relative to exterior layer 120 with a high degree of precision. When present, position sensor 260 may include and/or be any of a variety of position sensors, examples of which include a linear displacement sensor, a linear variable differential transformer (LVDT) sensor, a magnetic sensor, and/or a Hall effect sensor.

Additionally or alternatively, in some examples, SMA actuator 200 is configured to detect and/or characterize a position of sliding layer 130 relative to exterior layer 120 at least partially based upon a measured and/or calculated configuration of SMA element 210. In particular, in some examples, SMA element 210 is formed of an SMA material that varies in electrical resistance as the SMA material transitions between the austenitic and martensitic phases. Accordingly, in such examples, a measurement of the electrical resistance of SMA element 210 may be correlated to the phase of the SMA material, which in turn may be correlated to a length of SMA element 210 and/or of SMA wire 220. More specifically, in some examples, and as schematically illustrated in FIGS. 2-3, SMA actuator 200 includes an ohmmeter 264 that is configured to measure an electrical resistance of SMA element 210. In some such examples, position sensor 260 includes and/or is ohmmeter 264. Additionally or alternatively, in some examples, actuator controller 250 includes ohmmeter 264. As a more specific example, in some examples, actuator controller 250 is electrically coupled to each of SMA wire first end 222 and SMA wire second end 224 such that actuator controller 250 is operable to transmit electrical current 244 through SMA wire 220 and also to measure the electrical resistance of SMA wire 220. Additionally or alternatively, in some examples, SMA heat source 240 and/or electrical current source 242 includes ohmmeter 264.

In some examples, variable-porosity panel system 100 includes a plurality of panel assemblies 110 that may be independently and/or cooperatively transitioned among the plurality of panel configurations. FIG. 9 schematically illustrates an example of variable-porosity panel system 100 including a plurality of panel assemblies 110. In such examples, and as schematically illustrated in FIG. 9, variable-porosity panel system 100 may be described as including at least a first panel assembly 1110 that is transitioned among the plurality of panel configurations by a first SMA actuator 1200 and a second panel assembly 2110 that is transitioned among the plurality of panel configurations by a second SMA actuator 2200. Additionally, second example variable-porosity panel system 2100 of FIGS. 14-15 represents an example of variable-porosity panel system 100 that includes first panel assembly 1110 and second panel assembly 2110 (visible in FIG. 14).

In some examples in which variable-porosity panel system 100 includes a plurality of panel assemblies 110, actuator controller 250 is configured to control and/or regulate the panel configuration of each of the plurality of panel assemblies 110. More specifically, in some such examples, and as schematically illustrated in FIG. 9, each of first SMA actuator 1200 and second SMA actuator 2200 includes a respective SMA element 210, and actuator controller 250 is configured to selectively change the temperature of the respective SMA element 210 of each of first SMA actuator 1200 and second SMA actuator 2200. In this manner, in such examples, actuator controller 250 operates to selectively and dynamically transition each of first panel assembly 1110 and second panel assembly 2110 among the plurality of panel configurations.

Additionally or alternatively, in some examples, first SMA actuator 1200 and second SMA actuator 2200 are configured to actuate the respective panel assemblies 110 at least substantially concurrently and/or in a coordinated manner. In particular, in some such examples, first SMA actuator 1200 and second SMA actuator 2200 are electrically coupled to one another. In such examples, variable-porosity panel system 100 and/or panel assemblies 110 thereof may be described as being modular, as such a configuration may enable and/or facilitate adding any suitable number (e.g., quantity) of panel assemblies 110 to form a variable-porosity surface. With reference to FIG. 9, such a modular configuration may be facilitated and/or enabled by the feature that each of SMA wire first end 222 and SMA wire second end 224 of each SMA wire 220 extends from a common side and/or end of panel assembly 110 (namely, sliding layer first end 134 as schematically illustrated in FIGS. 2-5), thereby facilitating forming such electrical connections.

In particular, in some examples, and as schematically illustrated in FIG. 9, each of first SMA actuator 1200 and second SMA actuator 2200 includes SMA element 210 in the form of a respective SMA wire 220 that includes a respective SMA wire first end 222 and a respective SMA wire second end 224. In some such examples, the respective SMA wire second end 224 of the respective SMA wire 220 of second SMA actuator 2200 is electrically connected to the respective SMA wire first end 222 of the respective SMA wire 220 of first SMA actuator 1200. Accordingly, in some such examples, and as schematically illustrated in FIG. 9, actuator controller 250 transmits actuator control signal 252 and/or electrical current 244 to the respective SMA wire 220 of first SMA actuator 1200, which further is conveyed to the respective SMA wire 220 of second SMA actuator 2200. In this manner, actuator control signal 252 and/or electrical current 244 may result in the respective SMA wire 220 of each of first SMA actuator 1200 and second SMA actuator 2200 changing in temperature and/or length concurrently and/or in concert with one another.

Figure 16:
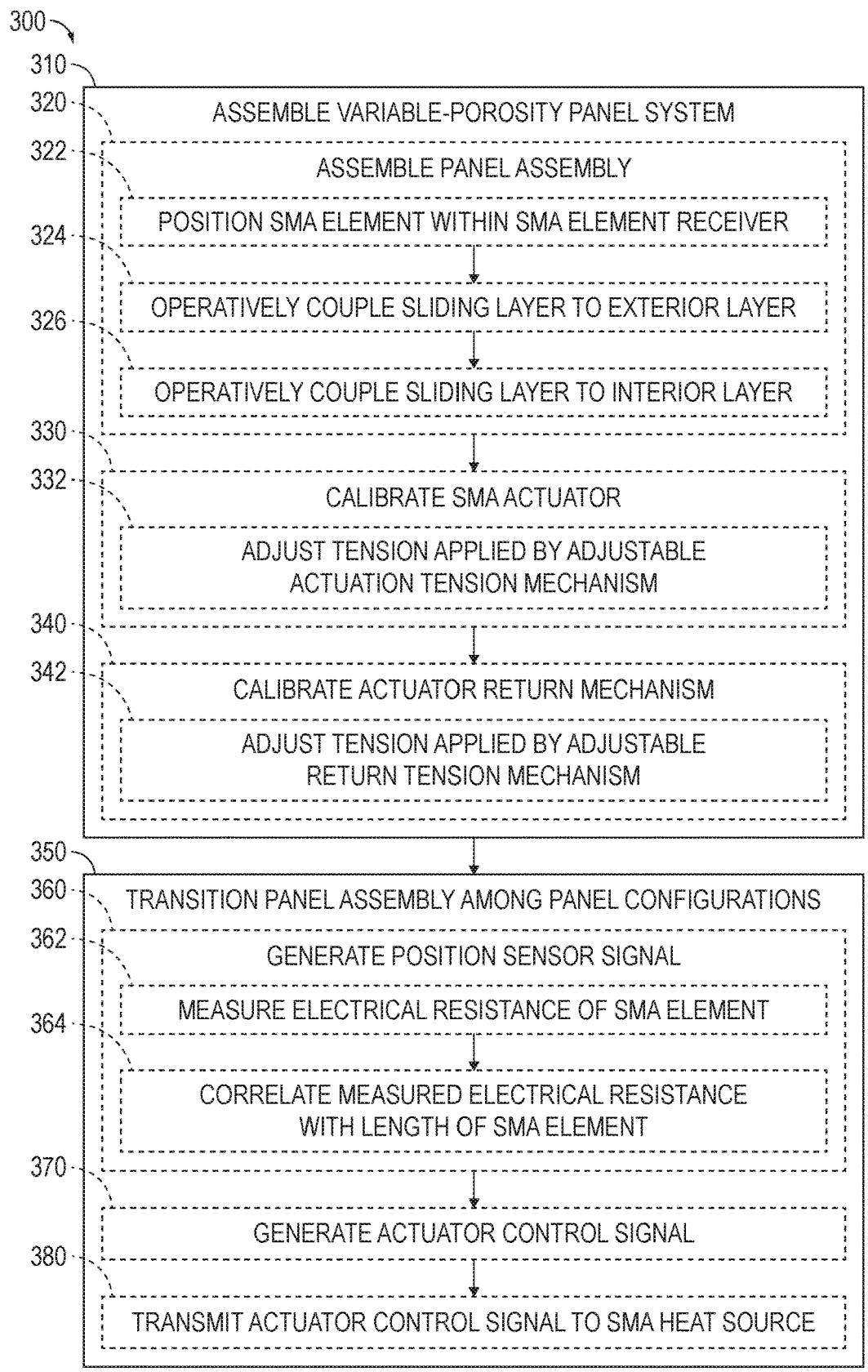
FIG. 16 is a flowchart representing examples of methods, according to the present disclosure, of operating a variable-porosity panel system.

FIG. 16 is a flowchart representing examples of methods 300 of operating a variable-porosity panel system, such as variable-porosity panel system 100 disclosed herein. As shown in FIG. 16, a method 300 of operating the variable-porosity panel system includes assembling, at 310, the variable-porosity panel system and/or transitioning, at 350, a panel assembly among the plurality of panel configurations. In examples in which method 300 includes the transitioning the panel assembly at 350, the transitioning the panel assembly at 350 is performed with an SMA actuator. Examples of panel assemblies and/or SMA actuators that may be utilized in conjunction with methods 300 are disclosed herein with reference to panel assembly 110 and/or SMA actuator 200, respectively.

In examples in which method 300 includes the assembling the variable-porosity panel system at 310, the assembling the variable-porosity panel system at 310 may be performed in any of a variety of manners. In particular, in some examples, and as shown in FIG. 16 and described in more detail herein, the assembling the variable-porosity panel system at 310 includes assembling, at 320, the panel assembly; calibrating, at 330, the SMA actuator; and/or calibrating, at 340, an actuator return mechanism, such as actuator return mechanism 270 disclosed herein.

When performed, the assembling the panel assembly at 320 may include assembling in any suitable manner. In particular, in some examples, and as shown in FIG. 16, the assembling the panel assembly at 320 includes positioning, at 322, an SMA element within an SMA element receiver and operatively coupling, at 324, a sliding layer of the panel assembly to an exterior layer of the panel assembly. In some such examples, and as shown in FIG. 16, the assembling the panel assembly at 320 additionally includes operatively coupling, at 326, the sliding layer to an interior layer of the panel assembly, such as interior layer 160 disclosed herein. In some more specific examples, the operatively coupling the sliding layer to the exterior layer at 324 and/or the operatively coupling the sliding layer to the interior layer at 326 includes aligning and/or engaging slide tracks that are defined in one or more of the exterior layer, the sliding layer, and the interior layer. Examples of such slide tracks are disclosed herein with reference to slide tracks 170.

In some examples, the positioning the SMA element within the SMA element receiver at 322 is performed prior to the operatively coupling the sliding layer to the exterior layer at 324. In some examples, the positioning the SMA element within the SMA element receiver at 322 includes fixedly coupling the SMA element to an SMA element engagement point, such as SMA element engagement point 142 disclosed herein. Examples of SMA elements, SMA element receivers, exterior layers, sliding layers, and/or interior layers that may be utilized in conjunction with methods 300 are disclosed herein with reference to SMA element 210, SMA element receiver 140, exterior layer 120, sliding layer 130, and/or interior layer 160, respectively.

In some examples, the calibrating the SMA actuator at 330 includes calibrating such that the SMA actuator transitions the panel assembly among the plurality of panel configurations based upon a temperature of the SMA element. In particular, in some examples, the calibrating the SMA actuator at 330 includes configuring and/or training the SMA element such that the panel assembly is in the fully closed configuration when the SMA element has a temperature that is below the threshold deactivated temperature, and such that the panel assembly is in the fully open configuration when the SMA element has a temperature that is above the threshold activated temperature. Alternatively, in some other examples, the calibrating the SMA actuator at 330 includes configuring and/or training the SMA element such that the panel assembly is in the fully open configuration when the SMA element has a temperature that is below the threshold deactivated temperature, and such that the panel assembly is in the fully closed configuration when the SMA element has a temperature that is above the threshold activated temperature.

In some examples, and as shown in FIG. 16, the calibrating the SMA actuator at 330 includes adjusting, at 332, a tension that is applied to the SMA element by an adjustable actuation tension mechanism. Similarly, in some examples, and as shown in FIG. 16, the calibrating the actuator return mechanism at 340 includes adjusting, at 342, a tension that is applied to the sliding layer by an adjustable return tension mechanism. Examples of adjustable actuation tension mechanisms and/or adjustable return tension mechanisms that may be utilized in conjunction with methods 300 are disclosed herein with reference to adjustable actuation tension mechanism 230 and/or adjustable return tension mechanism 290, respectively.

When performed, the transitioning the panel assembly at 350 may be performed at least partially passively. For example, and as discussed herein, the SMA actuator and/or the SMA element may be configured such that the temperature of the SMA element, and thus the panel configuration of the panel assembly, is at least partially based upon an ambient temperature to which the SMA element is exposed. More specifically, in some examples, the calibrating the SMA actuator at 330 includes configuring and/or training the SMA element such that the threshold deactivated temperature and the threshold activated temperature respectively correspond to ambient temperatures to which the SMA element is exposed during operative use of the variable-porosity panel system. As a more specific example, variable-porosity panel system may be incorporated in an aircraft, such as aircraft 20 disclosed herein, that is exposed to ambient temperatures that vary considerably during various phases of flight. Accordingly, in some such examples, the calibrating the SMA actuator at 330 includes configuring such that the threshold deactivated temperature corresponds to a relatively low temperature, such as may be encountered when the aircraft flies at a relatively high elevation and such that the threshold activated temperature corresponds to a relatively high temperature, such as may be encountered when the aircraft is at a relatively low elevation and/or on the ground.

Additionally or alternatively, in some examples, the transitioning the panel assembly at 350 is performed at least partially actively, such as under the control of an actuator controller such as actuator controller 250 disclosed herein. In particular, in some examples, and as shown in FIG. 16, the transitioning the panel assembly at 350 includes generating, at 370 and with the actuator controller, an actuator control signal and transmitting, at 380, the actuator control signal to an SMA heat source that varies and/or regulates the temperature of the SMA element. In some such examples, the generating the actuator control signal at 370 includes generating such that the SMA actuator transitions the panel assembly toward, or to, a commanded panel configuration among the plurality of panel configurations. In particular, in such examples, the commanded panel configuration may be at least partially based upon an operational condition associated with the variable-porosity panel system. More specifically, in some examples, the variable-porosity panel system is incorporated into a vehicle, such as an aircraft, and the commanded panel configuration is at least partially based upon a speed of the vehicle, an airspeed of the vehicle, an altitude of the vehicle, and/or a magnitude of acoustic noise that is generated by the vehicle. Examples of actuator control signals, SMA heat sources, and/or vehicles that may be utilized in conjunction with methods 300 are disclosed herein with reference to actuator control signal 252, SMA heat source 240, and/or vehicle 10, respectively.

In some examples, and as discussed, the SMA actuator is configured to utilize a feedback mechanism, such as to control the SMA actuator at least partially based upon a sensed position of the sliding layer. Accordingly, in some examples, and as shown in FIG. 16, the transitioning the panel assembly at 350 includes generating, at 360, a position sensor signal that at least partially represents a linear position of the sliding layer relative to the exterior layer. In such examples, the generating the actuator control signal at 370 is at least partially based on the position sensor signal. Examples of position sensor signals that may be utilized in conjunction with methods 300 are disclosed herein with reference to position sensor signal 262.

The generating the position sensor signal at 360 may be performed in any of a variety of manners. In some examples, the generating the position sensor signal at 360 is performed with a position sensor, such as position sensor 260 disclosed herein. Additionally or alternatively, in some examples, the generating the position sensor signal at 360 includes measuring an electrical resistance of the SMA element, which in turn may be correlated to a length of the SMA element. More specifically, in some examples, and as shown in FIG. 16, the generating the position sensor signal at 360 includes measuring, at 362 and with an ohmmeter, the electrical resistance of the SMA element and correlating, at 364, the electrical resistance of the SMA element with the length of the SMA element. In such examples, the correlating the electrical resistance of the SMA element with the length of the SMA element at 364 may be performed in any of a variety of manners, such as by performing a calculation based upon one or more known physical properties of the SMA element and/or by determining the length of the SMA element via a lookup table.

Illustrative, non-exclusive examples of inventive subject matter according to the present disclosure are described in the following enumerated paragraphs:

A1. A variable-porosity panel system (100), comprising:
a panel assembly (110), including:
an exterior layer (120) that defines a plurality of exterior layer pores (122); and
a sliding layer (130) that defines a plurality of sliding layer pores (132) and that is positioned adjacent to the exterior layer (120); and
a shape memory alloy (SMA) actuator (200) configured to translate the sliding layer (130) relative to the exterior layer (120) along a longitudinal direction (112) to align and misalign the plurality of sliding layer pores (132) with the plurality of exterior layer pores (122);
wherein the SMA actuator (200) includes an SMA element (210) operatively coupled to the sliding layer (130) and configured to change in length responsive to a change in temperature of the SMA element (210); wherein the SMA element (210) is configured to exert an actuation force (212) on the sliding layer (130) when the SMA element (210) decreases in length;
wherein the sliding layer (130) defines an SMA element receiver (140) that receives a portion of the SMA element (210); wherein the sliding layer (130) includes a sliding layer first end (134) and a sliding layer second end (136) spaced apart from the sliding layer first end (134) along the longitudinal direction (112); wherein the SMA element receiver (140) intersects the sliding layer first end (134) such that the SMA element (210) extends out of the sliding layer (130) only at the sliding layer first end (134); and wherein the SMA actuator (200) is configured to transition the panel assembly (110) among a plurality of panel configurations defined between and including a fully closed configuration, in which the plurality of sliding layer pores (132) is misaligned with the plurality of exterior layer pores (122), and a fully open configuration, in which the plurality of sliding layer pores (132) is aligned with the plurality of exterior layer pores (122).

A2. The variable-porosity panel system (100) of paragraph A1, wherein the plurality of panel configurations further includes a plurality of partially open configurations defined between and excluding the fully closed configuration and the fully open configuration.

A3. The variable-porosity panel system (100) of any of paragraphs A1-A2, wherein the SMA actuator (200) is configured to translate the sliding layer (130) relative to the exterior layer (120) to modulate a porosity of the panel assembly (110) between a minimum porosity when the panel assembly (110) is in the fully closed configuration and a maximum porosity when the panel assembly (110) is in the fully open configuration.

A4. The variable-porosity panel system (100) of paragraph A3, wherein the minimum porosity is one or more of 0%, at most 0.1%, at most 0.3%, and at most 0.5%.

A5. The variable-porosity panel system (100) of any of paragraphs A3-A4, wherein the maximum porosity is one or more of at least 3%, at least 5%, at least 10%, at least 15%, at most 20%, at most 12%, at most 7%, and at most 4%.

A6. The variable-porosity panel system (100) of any of paragraphs A1-A5, wherein the panel assembly (110) further includes an interior layer (160) that defines a plurality of interior layer pores (162) and that is positioned adjacent to the sliding layer (130) such that the sliding layer (130) extends between the exterior layer (120) and the interior layer (160).

A7. The variable-porosity panel system (100) of paragraph A6, wherein the plurality of interior layer pores (162) are aligned with the plurality of exterior layer pores (122).

A8. The variable-porosity panel system (100) of any of paragraphs A6-A7, wherein the interior layer (160) and the exterior layer (120) are secured in a fixed orientation relative to one another.

A9. The variable-porosity panel system (100) of any of paragraphs A6-A8, wherein the interior layer (160) and the exterior layer (120) are one or both of directly coupled to one another and integrally formed with one another.

A10. The variable-porosity panel system (100) of any of paragraphs A1-A9, wherein the panel assembly (110) is at least substantially flat.

A11. The variable-porosity panel system (100) of any of paragraphs A1-A9, wherein the panel assembly (110) is curved.

A12. The variable-porosity panel system (100) of paragraph A11, wherein the panel assembly (110) is curved through a single direction of curvature; and optionally wherein the single direction of curvature is at least substantially perpendicular to the longitudinal direction (112).

A13. The variable-porosity panel system (100) of any of paragraphs A1-A12, wherein one or more of the exterior layer (120), the sliding layer (130), and an/the interior layer (160) includes one or more slide tracks (170) configured to constrain the sliding layer (130) to translate relative to the exterior layer (120) along the longitudinal direction (112).

A14. The variable-porosity panel system (100) of any of paragraphs A1-A13, wherein each of the plurality of exterior layer pores (122), each of the plurality of sliding layer pores (132), and/or each of a/the plurality of interior layer pores (162) has a cross-sectional shape, as viewed along a direction perpendicular to the panel assembly (110), that is one or more of circular, elliptical, square, rectangular, triangular, elongate along a direction parallel to the longitudinal direction (112), and elongate along a direction perpendicular to the longitudinal direction (112).

A15. The variable-porosity panel system (100) of any of paragraphs A1-A14, further comprising a core structure (180) positioned adjacent to the panel assembly (110); wherein the core structure (180) is in fluid communication with an environment external to the panel assembly (110) via the panel assembly (110) when the panel assembly (110) is in a panel configuration other than the fully closed configuration.

A16. The variable-porosity panel system (100) of paragraph A15, further comprising a backplate (190) that at least partially covers the core structure (180).

A17. The variable-porosity panel system (100) of paragraph A16, wherein the core structure (180) includes, and optionally is, a plenum (182); and wherein the panel assembly (110) is configured to passively transfer air through the plenum (182) when the panel assembly (110) is in a panel configuration other than the fully closed configuration.

A18. The variable-porosity panel system (100) of paragraph A17, wherein the plenum (182) is configured to operate as a recirculation chamber to permit movement of fluid from a high pressure area exterior of the variable-porosity panel system (100) to a lower pressure area exterior of the variable-porosity panel system (100).

A19. The variable-porosity panel system (100) of any of paragraphs A15-A18, wherein the core structure (180) includes, and optionally is, a plurality of acoustic cells (184), optionally honeycomb cells.

A20. The variable-porosity panel system (100) of paragraph A19, wherein the plurality of acoustic cells (184) is configured to attenuate acoustic noise associated with an air flow (102) that flows adjacent to the panel assembly (110) when the panel assembly (110) is in a panel configuration other than the fully closed configuration.

A21. The variable-porosity panel system (100) of any of paragraphs A1-A20, wherein one or more of the exterior layer (120), the sliding layer (130), and an/the interior layer (160) are formed of one or more of a metal, aluminum, an aluminum alloy, titanium, a titanium alloy, a non-metal, a ceramic material, a composite material, a carbon fiber reinforced plastic, a boron fiber reinforced plastic, and an aramid fiber reinforced plastic.

A22. The variable-porosity panel system (100) of any of paragraphs A1-A21, wherein one or more of the exterior layer (120), the sliding layer (130), and an/the interior layer (160) are formed via an additive manufacturing technique.

A23. The variable-porosity panel system (100) of any of paragraphs A1-A22, further comprising a panel system base (104) operatively coupled to at least a portion of the panel assembly (110).

A24. The variable-porosity panel system (100) of paragraph A23, wherein the panel system base (104) includes, defines, and/or is integrally formed with one or more of:
(i) the exterior layer (120);
(ii) an/the interior layer (160);
(iii) a/the core structure (180);
(iv) a/the backplate (190);
(v) a/the plurality of acoustic cells (184); and
(iv) a/the plenum (182).

A25. The variable-porosity panel system (100) of any of paragraphs A1-A24, further comprising a panel assembly support (106) that supports at least a portion of the panel assembly (110).

A26. The variable-porosity panel system (100) of paragraph A25, wherein the panel assembly support (106) supports at least a portion of the panel assembly (110) relative to a/the panel system base (104).

A27. The variable-porosity panel system (100) of any of paragraphs A25-A26, wherein the panel assembly support (106) is operatively coupled to a/the panel system base (104).

A28. The variable-porosity panel system (100) of any of paragraphs A25-A27, wherein at least a portion of the panel assembly (110), optionally the sliding layer (130), is at least partially enclosed within the panel assembly support (106).

A29. The variable-porosity panel system (100) of any of paragraphs A25-A28, wherein the panel assembly support (106) includes, defines, and/or is integrally formed with one or more of:
(i) the exterior layer (120);
(ii) an/the interior layer (160);
(iii) a/the panel system base (104);
(iv) a/the core structure (180);
(v) a/the backplate (190);
(vi) a/the plurality of acoustic cells (184); and
(vii) a/the plenum (182).

A30. The variable-porosity panel system (100) of any of paragraphs A1-A29, wherein the SMA element (210) includes, and optionally is, an SMA wire (220) that extends between and includes an SMA wire first end (222) and an SMA wire second end (224).

A31. The variable-porosity panel system (100) of paragraph A30, wherein each of the SMA wire first end (222) and the SMA wire second end (224) extends from the sliding layer first end (134).

A32. The variable-porosity panel system (100) of any of paragraphs A30-A31, wherein the SMA wire (220) is fixedly coupled to one or more other portions of the variable-porosity panel system (100) at one or more SMA wire anchor points (226).

A33. The variable-porosity panel system (100) of paragraph A32, wherein one or both of the SMA wire first end (222) and the SMA wire second end (224) is fixedly coupled to a portion of the variable-porosity panel system (100) exterior of the sliding layer (130), optionally at one or more of the SMA wire anchor points (226).

A34. The variable-porosity panel system (100) of any of paragraphs A32-A33, wherein a/the panel system base (104) includes at least one of the one or more SMA wire anchor points (226).

A35. The variable-porosity panel system (100) of any of paragraphs A1-A34, wherein the SMA element (210) is formed of an SMA material that includes one or more of:
(i) a nickel titanium alloy;
(ii) a binary nickel titanium alloy;
(iii) a ternary alloy comprising nickel and titanium and one or more of hafnium, iron, zirconium, manganese, gold, and platinum;
(iv) a quaternary alloy comprising nickel and titanium and at least two of hafnium, iron, zirconium, manganese, gold, and platinum; and
(v) a quaternary alloy comprising nickel, titanium, manganese, and one or more of magnesium, gallium, cobalt, indium, tin, and copper.

A36. The variable-porosity panel system (100) of any of paragraphs A1-A35, wherein the SMA actuator (200) is configured such that the SMA element (210) exerts the actuation force (212) along a direction that is at least substantially parallel to the longitudinal direction (112).

A37. The variable-porosity panel system (100) of any of paragraphs A1-A36, wherein the SMA element (210) has a first length when a temperature of the SMA element (210) is below a threshold deactivated temperature; and wherein the SMA element (210) has a second length when the temperature of the SMA element (210) is above a threshold activated temperature.

A38. The variable-porosity panel system (100) of paragraph A37, wherein the second length is shorter than the first length.

A39. The variable-porosity panel system (100) of any of paragraphs A1-A38, wherein the SMA actuator (200) includes an SMA heat source (240) configured to selectively increase a/the temperature of the SMA element (210).

A40. The variable-porosity panel system (100) of paragraph A39, wherein the SMA heat source (240) includes, and optionally is, an electrical current source (242) that is configured to convey an electrical current (244) through the SMA element (210), optionally between a/the SMA wire first end (222) and a/the SMA wire second end (224) of a/the SMA wire (220), to increase the temperature of the SMA element (210) via resistive heating.

A41. The variable-porosity panel system (100) of paragraph A40, wherein the electrical current source (242) includes, and optionally is, a direct current (DC) source.

A42. The variable-porosity panel system (100) of any of paragraphs A40-A41, wherein the electrical current source (242) includes, and optionally is, an alternating current (AC) source.

A43. The variable-porosity panel system (100) of any of paragraphs A1-A42, wherein the SMA actuator (200) further includes an actuator return mechanism (270) operatively coupled to the sliding layer (130) and configured to exert a return force (274) on the sliding layer (130) that is opposed to the actuation force (212).

A44. The variable-porosity panel system (100) of paragraph A43, wherein the actuator return mechanism (270) is configured to exert the return force (274) along a direction that is one or both of:
(i) at least substantially parallel to the longitudinal direction (112); and
(i) at least substantially parallel to a direction along which the SMA element (210) exerts the actuation force (212).

A45. The variable-porosity panel system (100) of any of paragraphs A34-A44, wherein the actuator return mechanism (270) includes a biasing member (272) that passively exerts the return force (274) on the sliding layer (130).

A46. The variable-porosity panel system (100) of paragraph A45, wherein the biasing member (272) is operatively coupled to the sliding layer second end (136) of the sliding layer (130).

A47. The variable-porosity panel system (100) of any of paragraphs A45-A46, wherein the biasing member (272) is operatively coupled to the sliding layer (130) such that the biasing member (272) extends from the sliding layer second end (136) of the sliding layer (130).

A48. The variable-porosity panel system (100) of any of paragraphs A45-A47, wherein the biasing member (272) includes, and optionally is, a superelastic SMA wire (280) that extends between and includes a superelastic wire first end (282) and a superelastic wire second end (284).

A49. The variable-porosity panel system (100) of paragraph A48, wherein each of the superelastic wire first end (282) and the superelastic wire second end (284) extends from the sliding layer second end (136).

A50. The variable-porosity panel system (100) of any of paragraphs A48-A49, wherein the superelastic SMA wire (280) is formed of the same material as the SMA element (210).

A51. The variable-porosity panel system (100) of any of paragraphs A45-A50, wherein the biasing member (272) includes, and optionally is, a spring (276), optionally a constant-force spring (276).

A52. The variable-porosity panel system (100) of any of paragraphs A45-A51, wherein the sliding layer (130) defines a biasing member receiver (144) that receives a portion of the biasing member (272).

A53. The variable-porosity panel system (100) of paragraph A52, wherein the biasing member receiver (144) intersects the sliding layer second end (136) such that the biasing member (272) extends out of the sliding layer (130) only at the sliding layer second end (136).

A54. The variable-porosity panel system (100) of any of paragraphs A1-A53, wherein the SMA actuator (200) includes an adjustable actuation tension mechanism (230) that is configured to apply a tension force to the SMA element (210) that is at least substantially constant during operative use of the variable-porosity panel system (100); and wherein the adjustable actuation tension mechanism (230) is configured be selectively adjusted to adjust a magnitude of the actuation force (212).

A55. The variable-porosity panel system (100) of paragraph A54, wherein the adjustable actuation tension mechanism (230) is operatively coupled to a/the SMA wire (220).

A56. The variable-porosity panel system (100) of any of paragraphs A54-A55, wherein the adjustable actuation tension mechanism (230) is fixedly coupled to a portion of the variable-porosity panel system (100); optionally to one or more of the a/the panel system base (104), a/the panel assembly support (106), the panel assembly (110), the exterior layer (120), and an/the interior layer (160).

A57. The variable-porosity panel system (100) of any of paragraphs A1-A56, wherein a/the biasing member (272) includes an adjustable return tension mechanism (290) that is configured to apply a tension force to one or both of a/the biasing member (272) and the sliding layer (130) that is at least substantially constant during operative use of the variable-porosity panel system (100); and wherein the adjustable return tension mechanism (290) is configured be selectively adjusted to adjust a magnitude of a/the return force (274).

A58. The variable-porosity panel system (100) of paragraph A57, wherein the adjustable return tension mechanism (290) is operatively coupled to a/the superelastic SMA wire (280).

A59. The variable-porosity panel system (100) of any of paragraphs A57-A58, wherein the adjustable return tension mechanism (290) is fixedly coupled to a portion of the variable-porosity panel system (100); optionally to one or more of a/the panel system base (104), a/the panel assembly support (106), the panel assembly (110), the exterior layer (120), and an/the interior layer (160).

A60. The variable-porosity panel system (100) of any of paragraphs A1-A59, wherein one or both of the SMA element receiver (140) and a/the biasing member receiver (144) includes, and optionally is, one or more of a groove, a channel, and a tunnel.

A61. The variable-porosity panel system (100) of any of paragraphs A1-A60, wherein one or both of the SMA element receiver (140) and a/the biasing member receiver (144) is at least partially U-shaped.

A62. The variable-porosity panel system (100) of any of paragraphs A1-A61, wherein the SMA element (210) is configured to engage the SMA element receiver (140) and to exert at least a portion of the actuation force (212) on the sliding layer (130) at an SMA element engagement point (142).

A63. The variable-porosity panel system (100) of paragraph A62, wherein the SMA element (210) is fixedly coupled to the sliding layer (130) at the SMA element engagement point (142), optionally with an adhesive.

A64. The variable-porosity panel system (100) of paragraph A62, wherein the SMA element (210) is configured to slidingly engage the sliding layer (130) at the SMA element engagement point (142).

A65. The variable-porosity panel system (100) of any of paragraphs A1-A64, wherein a/the biasing member (272) is configured to engage the biasing member receiver (144) and to exert at least a portion of the return force (274) on the sliding layer (130) at a biasing member engagement point (146).

A66. The variable-porosity panel system (100) of paragraph A65, wherein the biasing member (272) is fixedly coupled to the sliding layer (130) at the biasing member engagement point (146), optionally with an adhesive.

A67. The variable-porosity panel system (100) of paragraph A65, wherein the biasing member (272) is configured to slidingly engage the sliding layer (130) at the biasing member engagement point (146).

A68. The variable-porosity panel system (100) of any of paragraphs A65-A67, when dependent from paragraph A62, wherein the SMA element engagement point (142) and the biasing member engagement point (146) are at least substantially aligned along the longitudinal direction (112).

A69. The variable-porosity panel system (100) of any of paragraphs A1-A68, further comprising an actuator controller (250) that is programmed to selectively change and/or regulate a temperature of the SMA element (210) to selectively and dynamically transition the panel assembly (110) among the plurality of panel configurations.

A70. The variable-porosity panel system (100) of paragraph A69, wherein the actuator controller (250) includes, and optionally is, one or both of an/the SMA heat source (240) and an/the electrical current source (242).

A71. The variable-porosity panel system (100) of any of paragraphs A69-A70, wherein the actuator controller (250) is configured to generate an actuator control signal (252) and to transmit the actuator control signal (252) to one or both of the SMA element (210) and an/the SMA heat source (240).

A72. The variable-porosity panel system (100) of paragraph A71, wherein the actuator control signal (252) includes, and optionally is, an/the electrical current (244).

A73. The variable-porosity panel system (100) of any of paragraphs A71-A72, wherein the actuator control signal (252) includes, and optionally is, a pulse-width-modulated electrical signal.

A74. The variable-porosity panel system (100) of any of paragraphs A71-A73, wherein the actuator control signal (252) includes, and optionally is, a command to one or both of the SMA heat source (240) and an/the electrical current source (242) to generate an/the electrical current (244).

A75. The variable-porosity panel system (100) of any of paragraphs A69-A74, wherein the SMA actuator (200) further includes one or more electrical leads (254) such that the actuator controller (250) is electrically coupled to one or both of the SMA element (210) and a/the SMA heat source (240) via the one or more electrical leads (254).

A76. The variable-porosity panel system (100) of paragraph A75, wherein the one or more electrical leads (254) are configured to convey an/the actuator control signal (252) from the actuator controller (250) to one or both of the SMA element (210) and the SMA heat source (240).

A77. The variable-porosity panel system (100) of any of paragraphs A1-A76, wherein the SMA actuator (200) further includes a position sensor (260) that is configured to generate a position sensor signal (262) that at least partially represents a linear position of the sliding layer (130) relative to the exterior layer (120) and to transmit the position sensor signal (262) to a/the actuator controller (250); and wherein the actuator control signal (252) is based, at least in part, on the position sensor signal (262).

A78. The variable-porosity panel system (100) of paragraph A77, wherein the position sensor (260) includes, and optionally is, one or more of a linear displacement sensor, a linear variable differential transformer (LVDT) sensor, a magnetic sensor, and a Hall effect sensor.

A79. The variable-porosity panel system (100) of any of paragraphs A1-A78, wherein the SMA actuator (200) is configured to measure an electrical resistance of the SMA element (210).

A80. The variable-porosity panel system (100) of paragraph A79, wherein the SMA actuator (200) includes an ohmmeter (264) that is configured to measure the electrical resistance of the SMA element (210).

A81. The variable-porosity panel system (100) of paragraph A80, when dependent from paragraph A76, wherein the position sensor (260) includes, and optionally is, the ohmmeter (264).

A82. The variable-porosity panel system (100) of any of paragraphs A80-A81, wherein a/the actuator controller (250) includes the ohmmeter (264).

A83. The variable-porosity panel system (100) of any of paragraphs A80-A82, wherein one or both of an/the SMA heat source (240) and an/the electrical current source (242) includes the ohmmeter (264).

A84. The variable-porosity panel system (100) of any of paragraphs A1-A83, wherein the panel assembly (110) is a first panel assembly (1110); wherein the SMA actuator (200) is a first SMA actuator (1200); and wherein the variable-porosity panel system (100) further includes a second panel assembly (2110) and a second SMA actuator (2200) configured to transition the second panel assembly (2110) among the plurality of panel configurations.

A85. The variable-porosity panel system (100) of paragraph A84, when dependent from paragraph A69; wherein each of the first SMA actuator (1200) and the second SMA actuator (2200) includes a respective SMA element (210); and wherein the actuator controller (250) is programmed to selectively change the temperature of the respective SMA element (210) of each of the first SMA actuator (1200) and the second SMA actuator (2200) to selectively and dynamically transition each of the first panel assembly (1110) and the second panel assembly (2110) among the plurality of panel configurations.

A86. The variable-porosity panel system (100) of any of paragraphs A84-A85, wherein a/the respective SMA element (210) of each of the first SMA actuator (1200) and the second SMA actuator (2200) includes a respective SMA wire (220) that extends between and includes a respective SMA wire first end (222) and a respective SMA wire second end (224); and wherein the respective SMA wire second end (224) of the respective SMA wire (220) of the second SMA actuator (2200) is electrically connected to the respective SMA wire first end (222) of the respective SMA wire (220) of the first SMA actuator (1200).

B1. A vehicle (10) comprising the variable-porosity panel system (100) of any of paragraphs A1-A86.

B2. The vehicle (10) of paragraph B1, wherein the vehicle (10) is an aircraft (20).

B3. The vehicle (10) of any of paragraphs B1-B2, wherein the vehicle (10) includes an engine (50) configured to accelerate an engine airflow to produce a thrust; and wherein the engine (50) includes at least a portion of the variable-porosity panel system (100), optionally the panel assembly (110).

B4. The vehicle (10) of paragraph B3, wherein the engine (50) includes an engine inlet (52) for receiving the engine airflow; and wherein the engine inlet (52) includes at least a portion of the variable-porosity panel system (100), optionally the panel assembly (110).

B5. The vehicle (10) of any of paragraphs B3-B4, wherein the engine (50) is a jet turbine engine (50); optionally a turbofan engine (50).

B6. The vehicle (10) of any of paragraphs B1-B5, wherein the vehicle (10) includes one or more wings (40); and wherein at least one of the one or more wings (40) includes at least a portion of the variable-porosity panel system (100), optionally the panel assembly (110).

B7. The vehicle (10) of paragraph B6, wherein at least one of the one or more wings (40) includes a flight control surface (42) that includes at least a portion of the variable-porosity panel system (100), optionally the panel assembly (110).

C1. A method (300) of operating the variable-porosity panel system (100) of any of paragraphs A1-A86, the method (300) comprising one or both of:
(i) assembling (310) the variable-porosity panel system (100); and
(ii) transitioning (350), with the SMA actuator (200), the panel assembly (110) among the plurality of panel configurations.

C2. The method (300) of paragraph C1, wherein the assembling (310) the variable-porosity panel system (100) includes one or more of:
(i) assembling (320) the panel assembly (110);
(ii) calibrating (330) the SMA actuator (200); and
(iii) calibrating (340) a/the actuator return mechanism (270).

C3. The method (300) of paragraph C2, wherein the assembling (320) the panel assembly (110) includes:
positioning (322) the SMA element (210) within the SMA element receiver (140); and
operatively coupling (324) the sliding layer (130) to the exterior layer (120).

C4. The method (300) of paragraph C2, wherein the positioning (322) the SMA element (210) within the SMA element receiver (140) is performed prior to the operatively coupling (324) the sliding layer (130) to the exterior layer (120).

C5. The method (300) of any of paragraphs C2-C3, wherein the positioning (322) the SMA element (210) within the SMA element receiver (140) includes fixedly coupling the SMA element (210) to an/the SMA element engagement point (142).

C6. The method (300) of any of paragraphs C1-C5, wherein the assembling (320) the panel assembly (110) further includes operatively coupling (326) the sliding layer (130) to an/the interior layer (160).

C7. The method (300) of any of paragraphs C2-C6, wherein the calibrating (330) the SMA actuator (200) includes configuring and/or training the SMA element (210) such that:
(i) the panel assembly (110) is in one of the fully closed configuration and the fully open configuration when the SMA element (210) has a temperature that is below a/the threshold deactivated temperature; and
(ii) the panel assembly (110) is in the other of the fully closed configuration and the fully open configuration when the SMA element (210) has a temperature that is above a/the threshold activated temperature.

C8. The method (300) of any of paragraphs C2-C7, wherein the calibrating (330) the SMA actuator (200) includes adjusting (332) a tension that is applied to the SMA element (210) by an/the adjustable actuation tension mechanism (230).

C9. The method (300) of any of paragraphs C2-C8, wherein the calibrating (340) the actuator return mechanism (270) includes adjusting (342) a tension that is applied to the sliding layer (130) by an/the adjustable return tension mechanism (290).

C10. The method (300) of any of paragraphs C1-C9, wherein the transitioning (350) the panel assembly (110) among the plurality of panel configurations is performed at least partially passively.

C11. The method (300) of paragraph C10, wherein the calibrating (330) the SMA actuator (200) includes configuring and/or training the SMA element (210) such that the threshold deactivated temperature and the threshold activated temperature respectively correspond to ambient temperatures to which the SMA element (210) is exposed during operative use of the variable-porosity panel system (100).

C12. The method (300) of any of paragraphs C1-C11, wherein the transitioning (350) the panel assembly (110) among the plurality of panel configurations is performed at least partially actively.

C13. The method (300) of paragraph C12, wherein the transitioning (350) the panel assembly (110) among the plurality of panel configurations includes:
(i) generating (370), with an/the actuator controller (250), an/the actuator control signal (252); and
(ii) transmitting (380) the actuator control signal (252) to an/the SMA heat source (240).

C14. The method (300) of paragraph C13, wherein the generating (370) the actuator control signal (252) includes generating such that the SMA actuator (200) transitions the panel assembly (110) to a commanded panel configuration among the plurality of panel configurations.

C15. The method (300) of paragraph C14, wherein the commanded panel configuration is based, at least in part, on an operational condition associated with the variable-porosity panel system (100).

C16. The method (300) of any of paragraphs C14-C15, wherein the variable-porosity panel system (100) is integrated into a/the vehicle (10), optionally an/the aircraft (20), and wherein the commanded panel configuration is based, at least in part, on one or more of a speed of the vehicle (10), an airspeed of the vehicle (10), an altitude of the vehicle (10), and a magnitude of acoustic noise that is generated by the vehicle (10).

C17. The method (300) of any of paragraphs C13-C16, wherein the transitioning (350) the panel assembly (110) among the plurality of panel configurations further includes generating (360) a/the position sensor signal (262) that at least partially represents a linear position of the sliding layer (130) relative to the exterior layer (120); and wherein the generating (370) the actuator control signal (252) is based, at least in part, on the position sensor signal (262).

C18. The method (300) of paragraph C17, wherein the generating (360) the position sensor signal (262) is performed with a/the position sensor (260).

C19. The method (300) of any of paragraphs C17-18, wherein the generating (360) the position sensor signal (262) includes:
(i) measuring (362), with an/the ohmmeter (264), an electrical resistance of the SMA element (210); and
(ii) correlating (364) the electrical resistance of the SMA element (210) with a/the length of the SMA element (210).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A variable-porosity panel system, comprising:
a panel assembly, including:
an exterior layer that defines a plurality of exterior layer pores; and
a sliding layer that defines a plurality of sliding layer pores and that is positioned adjacent to the exterior layer; and
a shape memory alloy (SMA) actuator configured to translate the sliding layer relative to the exterior layer along a longitudinal direction to align and misalign the plurality of sliding layer pores with the plurality of exterior layer pores;
wherein the SMA actuator includes an SMA element operatively coupled to the sliding layer and configured to change in length responsive to a change in temperature of the SMA element; wherein the SMA element is configured to exert an actuation force on the sliding layer when the SMA element decreases in length;
wherein the sliding layer defines an SMA element receiver that receives a portion of the SMA element; wherein the sliding layer includes a sliding layer first end and a sliding layer second end spaced apart from the sliding layer first end along the longitudinal direction; wherein the SMA element receiver intersects the sliding layer first end such that the SMA element extends out of the sliding layer only at the sliding layer first end; and wherein the SMA actuator is configured to transition the panel assembly among a plurality of panel configurations defined between and including a fully closed configuration, in which the plurality of sliding layer pores is misaligned with the plurality of exterior layer pores, and a fully open configuration, in which the plurality of sliding layer pores is aligned with the plurality of exterior layer pores.

2. The variable-porosity panel system of claim 1, wherein the panel assembly further includes an interior layer that defines a plurality of interior layer pores and that is positioned adjacent to the sliding layer such that the sliding layer extends between the exterior layer and the interior layer.

3. The variable-porosity panel system of claim 1, wherein the panel assembly is curved through a single direction of curvature that is at least substantially perpendicular to the longitudinal direction.

4. The variable-porosity panel system of claim 1, wherein the SMA element includes an SMA wire that extends between and includes an SMA wire first end and an SMA wire second end; and wherein each of the SMA wire first end and the SMA wire second end extends from the sliding layer first end.

5. The variable-porosity panel system of claim 1, wherein the SMA actuator includes an SMA heat source configured to selectively increase a temperature of the SMA element; and wherein the SMA heat source includes an electrical current source that is configured to convey an electrical current through the SMA element to increase the temperature of the SMA element via resistive heating.

6. The variable-porosity panel system of claim 1, wherein the SMA actuator further includes an actuator return mechanism operatively coupled to the sliding layer and configured to exert a return force on the sliding layer that is opposed to the actuation force; and wherein the actuator return mechanism is configured to exert the return force along a direction that is one or both of:
(i) at least substantially parallel to the longitudinal direction; and
(ii) at least substantially parallel to a direction along which the SMA element exerts the actuation force.

7. The variable-porosity panel system of claim 6, wherein the actuator return mechanism includes a biasing member that passively exerts the return force on the sliding layer; wherein the biasing member includes a superelastic SMA wire that extends between and includes a superelastic wire first end and a superelastic wire second end; and wherein each of the superelastic wire first end and the superelastic wire second end extends from the sliding layer second end.

8. The variable-porosity panel system of claim 6, wherein the actuator return mechanism includes a biasing member that passively exerts the return force on the sliding layer; wherein the sliding layer defines a biasing member receiver that receives a portion of the biasing member; and wherein the biasing member receiver intersects the sliding layer second end such that the biasing member extends out of the sliding layer only at the sliding layer second end.

9. The variable-porosity panel system of claim 1, wherein the SMA actuator includes an adjustable actuation tension mechanism that is configured to apply a tension force to the SMA element that is at least substantially constant during operative use of the variable-porosity panel system; and wherein the adjustable actuation tension mechanism is configured to be selectively adjusted to adjust a magnitude of the actuation force.

10. The variable-porosity panel system of claim 1, wherein the SMA element is configured to engage the SMA element receiver and to exert at least a portion of the actuation force on the sliding layer at an SMA element engagement point; and wherein the SMA element is fixedly coupled to the sliding layer at the SMA element engagement point.

11. The variable-porosity panel system of claim 1, wherein the SMA actuator further includes an actuator controller that is programmed to selectively change a temperature of the SMA element to selectively and dynamically transition the panel assembly among the plurality of panel configurations; and wherein the actuator controller is configured to generate an actuator control signal and to transmit the actuator control signal to one or both of the SMA element and an SMA heat source of the SMA actuator that is configured to selectively increase the temperature of the SMA element.

12. The variable-porosity panel system of claim 11, wherein one or both of the actuator controller and the SMA heat source includes an electrical current source that is configured to convey an electrical current through the SMA element to increase the temperature of the SMA element via resistive heating; and wherein the actuator control signal includes one or both of:
  (i) a command to the electrical current source to generate the electrical current; and
  (ii) the electrical current.

13. The variable-porosity panel system of claim 11, wherein the SMA actuator further includes a position sensor that is configured to generate a position sensor signal that at least partially represents a linear position of the sliding layer relative to the exterior layer and to transmit the position sensor signal to the actuator controller; and wherein the actuator control signal is based, at least in part, on the position sensor signal.

14. The variable-porosity panel system of claim 13, wherein the SMA actuator includes an ohmmeter that is configured to measure an electrical resistance of the SMA element; and wherein the position sensor includes the ohmmeter.

15. A vehicle comprising the variable-porosity panel system of claim 1.

16. A method of operating the variable-porosity panel system of claim 1, the method comprising one or both of:
  (i) assembling the variable-porosity panel system; and
  (ii) transitioning, with the SMA actuator, the panel assembly among the plurality of panel configurations.

17. The method of claim 16, wherein the method comprises the assembling the variable-porosity panel system; wherein the assembling the variable-porosity panel system includes calibrating the SMA actuator; and wherein the calibrating the SMA actuator includes configuring the SMA element such that:
  (i) the panel assembly is in one of the fully closed configuration and the fully open configuration when the SMA element has a temperature that is below a threshold deactivated temperature; and
  (ii) the panel assembly is in the other of the fully closed configuration and the fully open configuration when the SMA element has a temperature that is above a threshold activated temperature.

18. The method of claim 16, wherein the method comprises the transitioning the panel assembly among the plurality of panel configurations; and wherein the transitioning the panel assembly among the plurality of panel configurations includes:
  (i) generating, with an actuator controller, an actuator control signal; and
  (ii) transmitting the actuator control signal to an SMA heat source.

19. The method of claim 18, wherein the transitioning the panel assembly among the plurality of panel configurations further includes generating, with a position sensor, a position sensor signal that at least partially represents a linear position of the sliding layer relative to the exterior layer; and wherein the generating the actuator control signal is based, at least in part, on the position sensor signal.

20. The method of claim 19, wherein the generating the position sensor signal includes:
  (i) measuring, with an ohmmeter, an electrical resistance of the SMA element; and
  (ii) correlating the electrical resistance of the SMA element with a length of the SMA element.

* * * * *